United States Patent
McCann et al.

(10) Patent No.: US 12,532,166 B2
(45) Date of Patent: Jan. 20, 2026

(54) WLAN MULTI-LINK TDLS KEY DERIVATION

(71) Applicant: HUAWEI TECHNOLOGIES CO., LTD., Shenzhen (CN)

(72) Inventors: Stephen McCann, Hampshire (GB); Michael Montemurro, Toronto (CA); Sheng Sun, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 351 days.

(21) Appl. No.: 17/681,370

(22) Filed: Feb. 25, 2022

(65) Prior Publication Data

US 2022/0286844 A1 Sep. 8, 2022

Related U.S. Application Data

(60) Provisional application No. 63/156,536, filed on Mar. 4, 2021.

(51) Int. Cl.
*H04W 12/0433* (2021.01)
*H04W 12/041* (2021.01)
(Continued)

(52) U.S. Cl.
CPC ..... *H04W 12/0433* (2021.01); *H04W 12/041* (2021.01); *H04W 12/06* (2013.01);
(Continued)

(58) Field of Classification Search
CPC ............. H04W 12/0433; H04W 76/15; H04W 12/041; H04W 12/06; H04W 48/16; H04W 84/12
(Continued)

(56) References Cited

U.S. PATENT DOCUMENTS 9,949,305 B2 * 4/2018 Montemurro ....... H04L 67/1061
2008/0065884 A1 3/2008 Emeott et al.
(Continued)

FOREIGN PATENT DOCUMENTS

CN 104254062 A 12/2014
CN 111416874 A 7/2020
(Continued)

OTHER PUBLICATIONS

Claudio da Silva, Enhancing Client-based Sensing: Sensing by Proxy, IEEE 802.11-21/1692r2, Oct. 22, 2021.
(Continued)

*Primary Examiner* — Hermon Asres

(57) ABSTRACT

Systems and methods for WLAN multi-link TDLS key derivation. An aspect of the disclosure provides a method for WLAN multi-link communication. Such a method includes sending, by a first station to a second station, a discovery request comprising a link identifier indicating a non-access point (AP) multi-link device (MLD), wherein the first station and the second station are associated with an AP MLD. Such a method further includes receiving, by the first station from the second station, a discovery response. In some embodiments, the method further includes receiving, by the first station from an AP affiliated with the AP MLD, a message indicating a MAC address of the second station. In some embodiments, the discovery request is sent via an AP affiliated with the AP MLD and a non-AP station affiliated with the second station.

15 Claims, 14 Drawing Sheets

(51) Int. Cl.
  *H04W 12/06* (2021.01)
  *H04W 48/16* (2009.01)
  *H04W 76/15* (2018.01)
  *H04W 84/12* (2009.01)
(52) U.S. Cl.
  CPC ........... *H04W 48/16* (2013.01); *H04W 76/15* (2018.02); *H04W 84/12* (2013.01)
(58) Field of Classification Search
  USPC ........................................................ 370/338
  See application file for complete search history.

(56) References Cited

U.S. PATENT DOCUMENTS

| 2016/0073336 | A1* | 3/2016 | Geller | H04W 48/20 |
| --- | --- | --- | --- | --- |
| | | | | 455/434 |
| 2017/0311143 | A1* | 10/2017 | Yamaura | H04W 8/00 |
| 2021/0007168 | A1 | 1/2021 | Asterjadhi et al. | |
| 2021/0014776 | A1 | 1/2021 | Patil et al. | |
| 2021/0259033 | A1* | 8/2021 | Kim | H04W 76/11 |

FOREIGN PATENT DOCUMENTS

| JP | 2013510513 A | 3/2013 |
| --- | --- | --- |
| WO | 2014152853 A2 | 9/2014 |
| WO | 2021010606 A1 | 1/2021 |
| WO | 2021011476 A1 | 1/2021 |
| WO | 2022124979 A1 | 6/2022 |

OTHER PUBLICATIONS

LAN/MAN Standards Committee of the IEEE Computer Society, IEEE P802.111be/D0.Jan. 3, 2021.

Patil Abhishek et al.:"Resolution for CIDs related to TDLS (CC34)", IEEE 802.11-21/00240r2, Feb. 11, 2021 (Feb. 11, 2021), XP093016811, total 9 pages.

Yasuhiko Inoue al., "Latest Trends in Next-Generation Wireless LAN Standardization in IEEE 802.11 Working Group", (Dec. 2020), total 4 pages.

Rojan Chitrakar et al, "Legacy addressing in MLO", doc .: IEEE 802.11-21-0228r0, URL: https://mentor.IEEE.org/802.11 /dcn/ 21 /11-21-0228-00-00be-legacy-addressing-in-mlo.pptx, Jan. 2021, XP068178812, total 22 pages.

Mark Rison:"Review of P802.11be/D0.3 for CC34", IEEE 802.11-21/0218r0, Feb. 2021, total 46 pages.

Abhishek Patil et al.:"TDLS Handling in MLO", doc .: IEEE 802.11-20/1692r2, Date: Oct. 12, 2020, total 25 pages.

* cited by examiner

| OUI | Suite Type | Authenticaiton | Key Management | Key Derivation | Authentication numbers |
|---|---|---|---|---|---|
| 00-0F-AC | 21 | ML-TDLS | ML-TPK Handshake | Defined in 12.7.1.6.2 | N/A |

FIG. 7

WLAN MULTI-LINK TDLS KEY DERIVATION

CROSS-REFERENCE TO RELATED APPLICATIONS

This application claims the benefit of and priority to U.S. Provisional Application Ser. No. 63/156,536 filed Mar. 4, 2021, the entire contents of which are hereby incorporated by reference.

FIELD OF THE INVENTION

The present invention pertains to the field of communication networks, and in particular to systems and methods for WLAN multi-link communication. An aspect of the disclosure provides a method and system for TDLS key derivation WLAN multi-link communication.

BACKGROUND

IEEE 802.11 security is established between a station (STA) and an access point (AP) to protect traffic exchanged between the two entities. An AP multi-link device (MLD) is also an AP with additional affiliated APs, each having a different authenticator for establishing security associations. Accordingly, an AP multi-link device (MLD) may have multiple authenticators for establishing security associations with a plurality of devices, including legacy STAs and non-AP MLDs. Having multiple authenticators adds a layer of complexity for managing security associations for establishing communication links.

Further, due to the nature of security associations and authenticators' involvement, communication links may be required to pass through one or more APs, thereby requiring additional network resources for ensuring protection and adequate service. This may occur, for example, when two STAs (a legacy non-AP STA (e.g., a WLAN enabled screen), and a non-AP MLD (e.g., a smart phone)) want to communicate with each other, and each STA has established a security association with a different AP authenticator.

Therefore, there is a need for a system and methods for WLAN multi-link TDLS key derivation that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

According to a first aspect of the disclosure, a method for WLAN multi-link communication is provided. Such a method includes sending, by a first station to a second station, a discovery request comprising a link identifier indicating a non-access point (AP) multi-link device (MLD), wherein the first station and the second station are associated with an AP MLD. Such a method further includes receiving, by the first station from the second station, a discovery response. The method may provide for establishing a TDLS link between a legacy STA and a non-AP MLD.

In some embodiments of the first aspect, the method further includes receiving, by the first station from an AP affiliated with the AP MLD, a message indicating a MAC address of the second station. The method may allow for discovering a potential TDLS peer.

In some embodiments of the first aspect, the discovery request is sent via an AP affiliated with the AP MLD and a non-AP station affiliated with the second station. In some embodiments of the first aspect, one of the discovery request or the discovery response further comprises a multi-link element (MLE) indicating one or more addresses of AP entities. The method may further allow a legacy STA to determine that an AP (and affiliated AP) are multi-link enabled.

In some embodiments of the first aspect, the method further includes sending, by the first station to the second station, a setup request, and receiving, by the first station from the second station, a setup response. The method may allow for establishing a TDLS link between peer STAs.

In some embodiments of the first aspect, the setup request indicates an authentication and key management (AKM) suite for establishing a link between the first station and the second station. In some embodiments of the first aspect, the method further includes deriving, by the first station, a key based on the AKM suite, and sending, by the first station to the second station, a setup confirmation message. The method may further allow for negotiating a peer key that is bound to multiple authenticators. The method may further allow for a legacy STA to use a legacy TDLS handshake or an enhanced ML TDL handshake.

In some embodiments of the first aspect, the first station is preconfigured to send the discovery request comprising the link identifier. In some embodiments of the first aspect, the first station has a security association through a first authenticator associated with an AP affiliated with the AP MLD, and the second station has a security association through a second authenticator associated with the AP MLD, wherein the first authenticator and the second authenticator have different MAC addresses. The method may further allow for a TDLS key derivation that accommodates multiple authenticator identities.

According to a second aspect of the disclosure, another method for WLAN mutli-link communication is provided. Such a method includes receiving, by a first station from a second station, a discovery request comprising a link identifier indicating a non-access point (AP) multi-link device (MLD), wherein the first station and the second station are associated with an AP MLD. The method further includes sending, by the first station to the second station, a discovery response. The method may provide for establishing a TDLS link between a legacy STA and a non-AP MLD.

In some embodiments of the second aspect, such a method further includes receiving, by the first station from an AP affiliated with the AP MLD, a message indicating a MAC address of the second station. The method may allow for discovering a potential TDLS peer.

In some embodiments of the second aspect, the discovery response is sent via an AP affiliated with the AP MLD and a non-AP station affiliated with the first station. In some embodiments of the second aspect, one of the discovery request or the discovery response further comprises a multi-link element (MLE) indicating one or more addresses of AP entities. The method may further allow a legacy STA to determine that an AP (and affiliated AP) are multi-link enabled.

In some embodiments of the second aspect, the method further includes receiving, by the first station from the second station, a setup request indicating an authentication and key management (AKM) suite. The method may further allow for negotiating a peer key that is bound to multiple authenticators. The method may further allow for a legacy STA to use a legacy TDLS handshake or an enhanced ML TDL handshake.

In some embodiments of the second aspect, the method further includes deriving, by the first station, a key based on the AKM suite, and sending, by the first station to the second station, a setup response indicating the AKM suite. In some embodiments of the second aspect, the method further includes receiving, by the first station from the second station, a setup confirmation message indicating the establishment of a link between the first station and the second station. The method may further allow for a TDLS key derivation that accommodates multiple authenticator identities.

According to a third aspect of the disclosure, a WLAN multi-link communication system comprising a first station and a second station is provided. The first station being configured for sending, to the second station, a discovery request including a link identifier indicating a non-access point (AP) multi-link device (MLD), wherein the first station and the second station are associated with an AP MLD. The first station further being configured for receiving, from the second station, a discovery response. The second station being configured for receiving, from the second station, the discovery request. The second station further being configured for sending, to the second station, the discovery response. The method may provide for establishing a TDLS link between a legacy STA and a non-AP MLD.

In some embodiments of the third aspect, the first station is further configured for receiving, from an AP affiliated with the AP MLD, a message indicating a MAC address of the second station. In some embodiments of the third aspect, the second station is further configured for receiving from the AP, a message indicating a MAC address of the first station. The method may allow for discovering a potential TDLS peer.

In some embodiments of the third aspect, the first station is further configured for sending, to the second station, a setup request indicating an authentication and key management (AKM) suite. In some embodiments of the third aspect, the first station is further configured for receiving, from the second station, a setup response. In some embodiment of the third aspect, the second station is further configured for receiving, from the first station, the setup request. The method may allow for establishing a TDLS link between peer STAs.

In some embodiment of the third aspect, the second station is further configured for deriving, a first key based on the AKM suite. In some embodiment of the third aspect, the second station is further configured for sending, to the second station, the setup response. In some embodiments of the third aspect, the first station is further configured for deriving, a second key based on the AKM suite and the setup response. In some embodiments of the third aspect, the first station is further configured for sending, to the second station, a setup confirmation message indicating the establishment of a link between the first and the second station. The method may further allow for negotiating a peer key that is bound to multiple authenticators. The method may further allow for a legacy STA to use a legacy TDLS handshake or an enhanced ML TDL handshake.

In some embodiments of the third aspect, the second station is further configured for receiving, from the first station, the setup confirmation message. In some embodiments of the third aspect, the first station has a security association through a first authenticator associated with an AP affiliated with the AP MLD. In some embodiments of the third aspect, the second station has a security association through a second authenticator associated with the AP MLD, wherein the first authenticator and the second authenticator have different MAC addresses. The method may further allow for a TDLS key derivation that accommodates multiple authenticator identities. The method may provide for establishing a TDLS link between a legacy STA and a non-AP MLD.

According to a fourth aspect of the disclosure, an apparatus is provided, where the apparatus includes modules configured to perform the methods, according to one or more aspects described herein.

According to a fifth aspect, an apparatus is provided, where the apparatus includes: a memory, configured to store a program; a processor, configured to execute the program stored in the memory, and when the program stored in the memory is executed, the processor is configured to perform methods in one or more aspects described herein.

According to a sixth aspect, a computer readable medium is provided, where the computer readable medium stores program code executed by a device, and the program code is used to perform the methods in one or more aspects described herein.

According to a seventh aspect, a chip is provided, where the chip includes a processor and a data interface, and the processor reads, by using the data interface, an instruction stored in a memory, to perform the methods in one or more aspect described herein.

Other aspects of the disclosure provide for apparatus, and systems configured to implement the methods according to the first aspect disclosed herein. For example, wireless stations and access points can be configured with machine readable memory containing instructions, which when executed by the processors of these devices, configures the device to perform the methods in one or more aspects disclosed herein.

Embodiments have been described above in conjunction with aspects of the present invention upon which they can be implemented. Those skilled in the art will appreciate that embodiments may be implemented in conjunction with the aspect with which they are described but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which:

FIG. 7 illustrates an authentication and key management (AKM) suite, according to an embodiment of the present disclosure.

It will be noted that throughout the appended drawings, like features are identified by like reference numerals.

DETAILED DESCRIPTION

A wireless communications system to which embodiments of the present disclosure are applicable may be a wireless local area network (Wireless local area network, WLAN). The communications device may be a wireless communications device that supports parallel transmission on a plurality of links. Such a communication device may be called a multi-link device (MLD) or a multi-band device. MLDs may have higher transmission efficiency and higher throughput than devices that support only single-link transmission.

Figure 1:
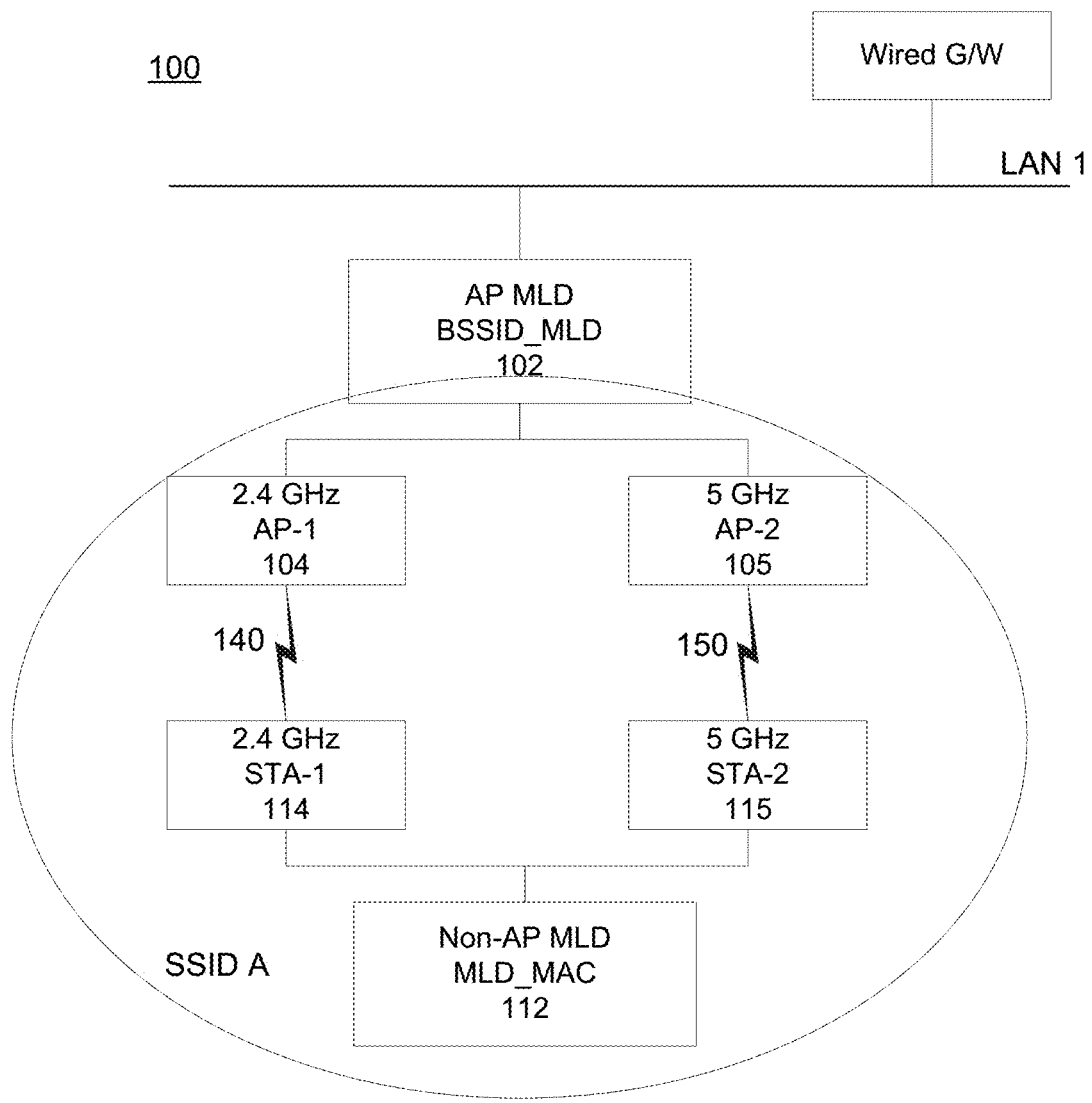
FIG. 1 illustrates an MLD architecture, according to an embodiment of the present disclosure.

An MLD may be described as a wireless local area network (WLAN) entity that has multiple radio links to another MLD entity as further described in reference to FIG. 1. An AP MLD may refer to an MLD, where each station (STA) affiliated with the MLD is an AP. A non-AP MLD may be referred to an MLD, where each STA affiliated with the MLD is a non-AP STA.

FIG. 1 illustrates an MLD architecture, according to an embodiment of the present disclosure. As may be appreciated by a person skilled in the art, an MLD device may be a logical entity that may have more than one affiliated STA and a single medium access control (MAC) service access point (SAP) to logical link control (LLC), which may include one MAC data service.

A typical use case of MLD may be an Access Point (AP) MLD 102 connected to a non-AP MLD (a WLAN terminal) 112 using 2 radio links in the 2.4 GHz (link 140) and 5 GHz (link 150) WLAN bands. The individual radio links 140 and 150 may be referred to as links. Radio units 104, 105 within the AP MLD 102 are referred to as affiliated APs (e.g., 2.4 GHz AP-1 or otherwise AP-1 104 and 5 GHz AP-2 or otherwise AP-2 105). Radio units 114, 115 within the Non-AP MLD 112 are referred to as affiliated STAs (e.g., 2.4 GHz STA-1 or otherwise STA-1 114 and 5 GHz STA-2 or otherwise STA-2 115).

Each of the affiliated APs 104 and 105 may also serve latency non-AP STAs. For example, an AP MLD 102 with a 2.4 GHz radio link 140 could also behave as a legacy AP serving a legacy 802.11ax non-AP STA. In this case, the source of the 2.4 GHz radio link is an affiliated AP 104 within the AP MLD 102 as illustrated.

As may be appreciated by a person skilled in the art, the operation of an MLD may be different from that of two logical stations (STAs) (a multiband client) in the same physical entity (e.g., two non-AP STAs in the same handset). Within an MLD, traffic may be coordinated between the two links and the security association is maintained across them. This provides some benefits over the multiple logical STAs concept.

As mentioned, an MLD may include one or more affiliated STAs, as shown in FIG. 1. The AP MLD 102 may be connected to a local area network (LAN), e.g., LAN 1, which may be connected to a wired G/W as illustrated. The AP MLD 102 may have a basic service set (BSS) identifier (ID) of MLD. FIG. 1 illustrates Service Set Identifier A (SSID A) as an identifier of the network. In this case, the AP MLD 102 provides access to the LAN to non-AP MLDs through the affiliated APs (AP-1 and AP-2). AP-1 and AP-2 can also provide access to the LAN for legacy devices. The STAs (e.g., 104, 105, 114 and 115) are logical stations that can each work on one link. The logical stations 104 and 105 which belong to the AP MLD may be access points (APs) and the logical stations 114 and 115 which belong to the non-AP MLD may be non-access point stations (non-AP STAs).

Without the limiting the scope of the disclosure, a multi-link device 102 that belongs to an AP may be referred to as a multi-link AP, a multi-link AP device, or an AP multi-link device (AP multi-link device, AP MLD). Similarly, a multi-link device 112 that belongs to a non-AP STA may be referred to as a multi-link STA, a multi-link STA device, or a STA multi-link device (STA multi-link device, STA MLD). Further, "a member STA" may be referred to as "a STA", such that "a multi-link device that includes a member STA" may be described as "a multi-link device that includes a STA".

The MLD 102 or 112 may be a single antenna device or may be a multi-antenna device. For example, a device with more than two antennas may be used. A quantity of antennas included in the multi-link device is not limited in embodiments of the present disclosure. The multi-link device 102 or 112 may allow a service of a same access type to be transmitted on different links, or even allow a same data packet to be transmitted on different links. Alternatively, services of the same access type cannot be transmitted on different links, but services of different access types can be transmitted on different links.

IEEE 802.11 security is established between a STA and an AP to protect traffic exchanged by the two entities. The security framework is an authentication and key management framework that has been built on top of the IEEE 802.1X standard. IEEE 802.1X defines a protocol that allows a Supplicant (which is mapped in an IEEE 802.11 infrastructure network to a non-AP STA) and an Authenticator (which is mapped in an IEEE 802.11 infrastructure network to an AP) to mutually authenticate and establish a security association. In an IEEE 802.11 infrastructure network, the identity of the supplicant may be the MAC address of the STA, and the identity of the Authenticator may be the MAC address of the AP.

Figure 2:
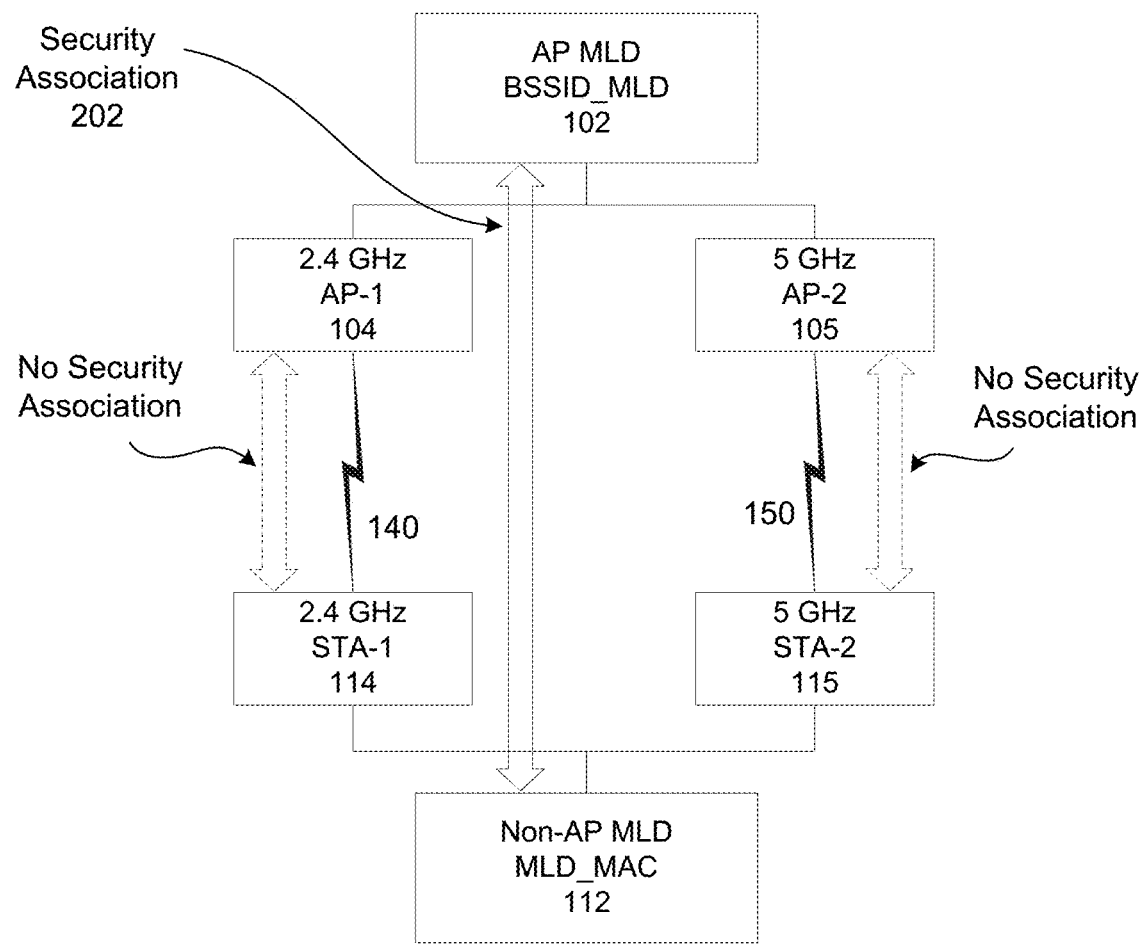
FIG. 2 illustrates an MLD security association, according to an embodiment of the present disclosure.

FIG. 2 illustrates an MLD security association, according to an embodiment of the present disclosure. FIG. 2 shows that a non-AP MLD 112 may use its non-AP MLD MAC address to associate with an AP MLD 102. The non-AP MLD 112 and the AP MLD 102 may mutually authenticate each other to establish a communications state to exchange data. The MLDs 102 and 112 may communicate over links 140 and 150 between affiliated STAs (link 140 between AP-1 104 and STA-1 114 and Link 150 between AP-2 105 and STA-2 115). When authentication and association protocols complete successfully, the affiliated STAs 114 and 115 of the non-AP MLD 112 may then be associated with the respective affiliated APs 104 and 105 of the AP MLD 102.

From an MLD security point of view, there is a security association 202 between the non-AP MLD 112 and AP MLD 102 but there is no security association between the affiliated non-AP STAs (STA-1 114 and STA-2 115) and their respective affiliated APs (2.4 GHz AP-1 104 and 5 GHz AP-2 105). The affiliated STAs (114 and 115) may be used to facilitate communication between the non-AP MLD 112 and the AP MLD 102.

Figure 3:
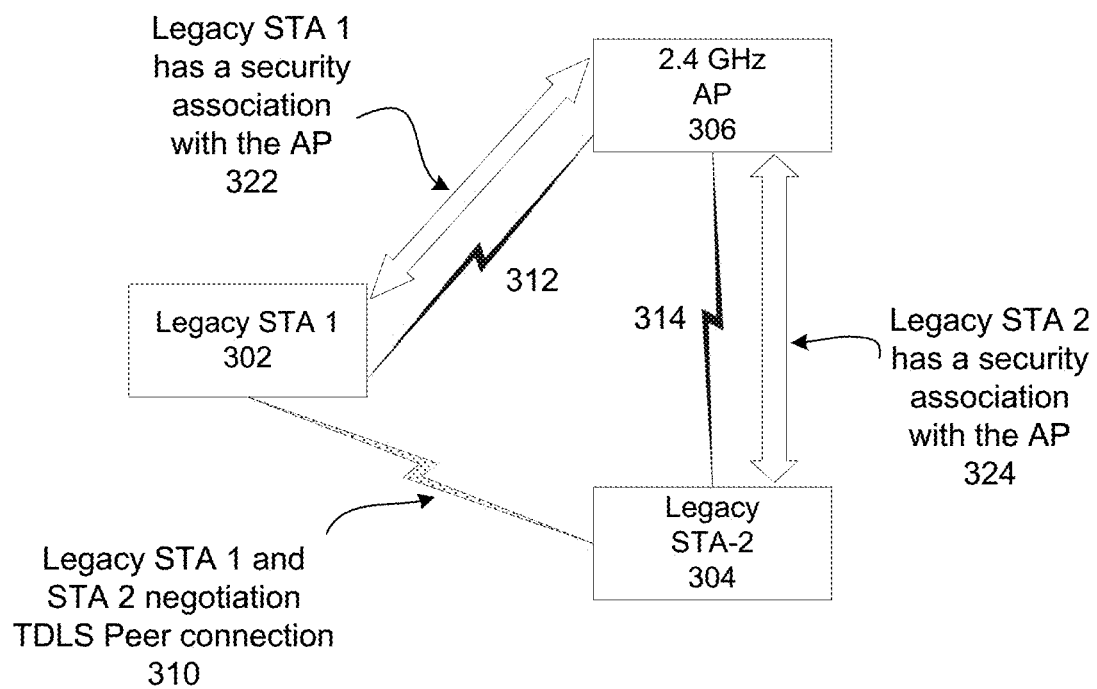
FIG. 3 shows a Tunneled Direct Link Setup (TDLS) security operation, according to an embodiment of the present disclosure.

FIG. 3 shows a Tunneled Direct Link Setup (TDLS) security operation, according to an embodiment of the present disclosure. A TDLS may allow two peer non-AP STAs, e.g., legacy STA-1 302 and legacy STA-2 304 of FIG. 3, to establish direct communication with each other. Once a TDLS link 310 has been established, traffic may flow directly between the peer STAs 302 and 304 and is not bridged through an AP 306. As may be appreciated by a person skilled in the art, TDLS, for example TDLS 310, may be established between two STAs associated to an AP (e.g., AP 306) in the same BSS.

Discovery and set up frames may be encapsulated within data frames, so they are exchanged between peer STAs 302 and 304 through the AP 306 (for example, through links 312 and 314). This has the benefit that the AP 306 does not need to be "TDLS capable". Once the setup is complete, the two non-AP STAs 302 and 304 may communicate directly with each other over the established TDLS link 310.

TDLS communications may be used, for example, in Chromecast (screen sharing, and streaming to a display device).

The objective of TDLS security is to establish a direct link, e.g., link 310, between legacy STA-1 302 and legacy STA-2 304, using the 2.4 GHz AP 306 to facilitate communication for discovery and setup. The STAs 302 and 304 must be associated to the same AP 306 in the same BSS (basic service set). Once the security connections (322 and 324) are established, data can flow directly between the 2 STAs 302 and 304 (via TDLS link 310) and not through the AP 306.

As may be appreciated by a person skilled in the art, TDLS establishment may comprise two stages: TDLS Discovery and TDLS Setup.

During the TDLS Discovery stage, a STA, e.g., Legacy STA-1 302, may determine that it is communicating with a peer STA, e.g., legacy STA-2 304, on a local LAN. This may be done at the application or network layer. The STA, e.g., Legacy STA-1 302, may then determine that it may be able to communicate directly with the peer STA, e.g., Legacy STA-2 304, through a TDLS. To discover whether a TDLS link is possible, the STA (e.g., legacy STA-1 302) may transmit a TDLS Discovery Request message to the peer STA (e.g., legacy STA-2 304). The TDLS Discovery Request frame may be transmitted to the peer STA (e.g., legacy STA-2 304) via an AP (e.g., the 2.4 GHz AP 306) through links 312 and 314. In turn, the peer STA (e.g., legacy STA-2 304) responds to the originating STA (e.g., legacy STA-1 302) with a TDLS Discovery Response message, via the 2.4 GHz AP 306. At this point, the STA (e.g., legacy STA-1 302) and the peer STA (Legacy STA-2 304) may determine whether they are connected to the same BSS (i.e., the same AP).

During the TDLS Setup stage, the STA (e.g., legacy STA-1 302) may transmits a TDLS Setup Request frame to the peer STA (e.g., legacy STA-2 304) via the 2.4 GHz AP 306. The peer STA (e.g., legacy STA-2 304) may process the TDLS Setup Request and derive TDLS key material (the TDLS Peer Key). The peer STA (e.g., legacy STA-2 304) may then respond with a TDLS Setup Response to the STA (e.g., legacy STA-1 302) via the AP 306. The STA (e.g., legacy STA-1 302) may derive TDLS key material and validate the TDLS Setup Response. The STA (e.g., legacy STA-1 302) may send a TDLS Setup Confirm to the peer STA (e.g., legacy STA-2 304) via the 2.4 GHz AP 306. The peer STA (e.g., legacy STA-2 304) may validate the TDLS Setup Confirm frame to complete the TDLS handshake.

Following the handshake, the STA (e.g., legacy STA-1 302) and the peer STA (e.g., legacy STA-2 304) may communicate directly with encapsulated traffic using the TDLS key material. The STA (e.g., legacy STA-1 302) and the peer STA (e.g., legacy STA-2 304) may then be able to communicate directly over a secure connection 310 while maintaining connectivity to the AP 306.

Figure 4:
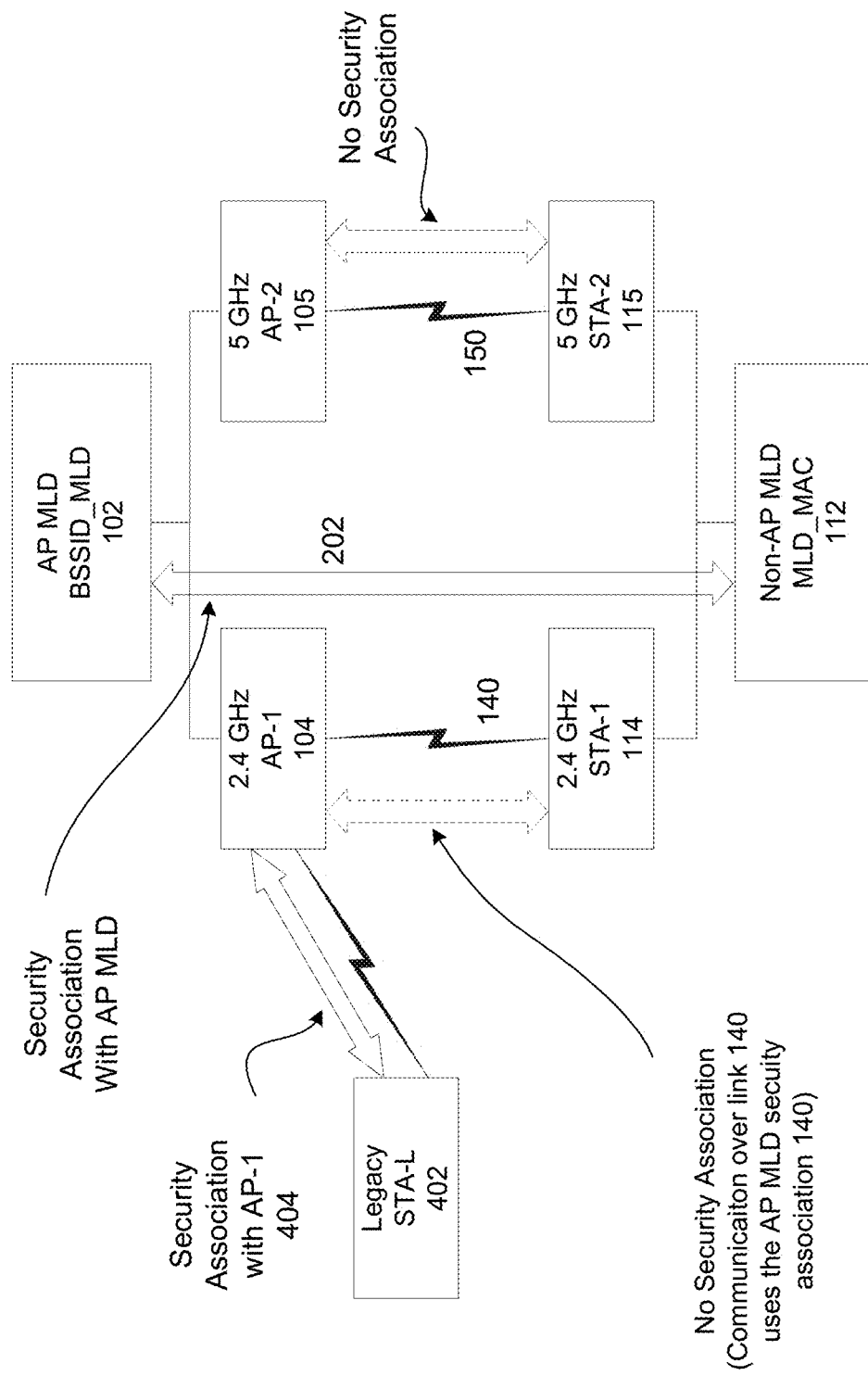
FIG. 4 shows a legacy STA connected to an affiliated AP within an AP MLD, according to an embodiment of the present disclosure.

FIG. 4 shows a legacy STA connected to an affiliated AP-1 within an AP MLD, according to an embodiment of the present disclosure. The legacy STA (legacy STA-L 402 in FIG. 4) which may be e.g., a WLAN enabled screen, may wish to establish a TDLS link with the non-AP MLD 112 (e.g., a smart phone).

Given that the non-AP MLD 112 can communicate with the legacy STA-L 402 over either affiliated link (e.g., link 140 or link 150), the non-AP MLD 112 may have to determine which link it needs to use to establish TDLS communication with the legacy STA-L 402. To do this, the BSSID for the legacy STA-L 402, which in FIG. 4 would be the MAC Address of AP-1 104, is needed by the non-AP MLD 112 to determine which affiliated STA the non-AP MLD 112 may use to establish the TDLS connection.

When a non-AP MLD 112 associates to an AP MLD 102, the non-AP MLD 112 may establish a security association 202 through the authenticator associated with the AP MLD 102. Accordingly, no security association exists between the STA-1 114 and the affiliated AP-1 104, since the communication over link 140 may use the AP MLD security association 202.

When a legacy STA-L 402 associates with an affiliated AP-1 104, the legacy STA-L 402 may establish a security association 404 through the authenticator associated with the affiliated AP-1 104. As a result, there may be two Authenticators involved (one in the AP MLD 102 and one in the affiliated AP-1 104), which presents a challenge for establishing a TDLS between the legacy STA-L 402 and the non-AP MLD 112.

To an associated non-AP MLD 112, the Authenticator identity may be associated with the MAC address for the AP MLD 102. On the other hand, to an associated legacy STA-L 402, the Authenticator identity for the legacy STA-L 402 may be associated with the MAC address of the affiliated AP-1 104 (the AP which is affiliated with the AP MLD 102).

As may be appreciated by a person skilled in the art, each of the AP-1 104, AP-2 105, and AP MLD 102 may have its own separate MAC address to which an Authenticator identity may be associated with. Accordingly, each Authenticator identity may be associated with a different MAC address.

Accordingly, since the security association may be established with different entities, the protocol and key binding for TDLS may need to be modified to accommodate the different authenticator identities.

Embodiments may provide for modifying, during the discovery stage, the TDLS Discovery frames to allow a non-AP MLD, for example non-AP MLD 112, to advertise MLD information (through the inclusion of an ML element).

This may allow a legacy STA, for example legacy STA-L 402, to discover that a potential TDLS peer is a non-AP MLD, e.g., non-AP MLD 112, that is using the AP as an affiliated AP. Accordingly, the non-AP MLD, e.g., non-AP MLD 112, may use the BSSID field in the Link Identifier element (which may set to the 2.4 GHz AP-1 104, for example) to determine which link to use for discovering and establishing a TDLS link with the legacy peer STA.

Figure 5:
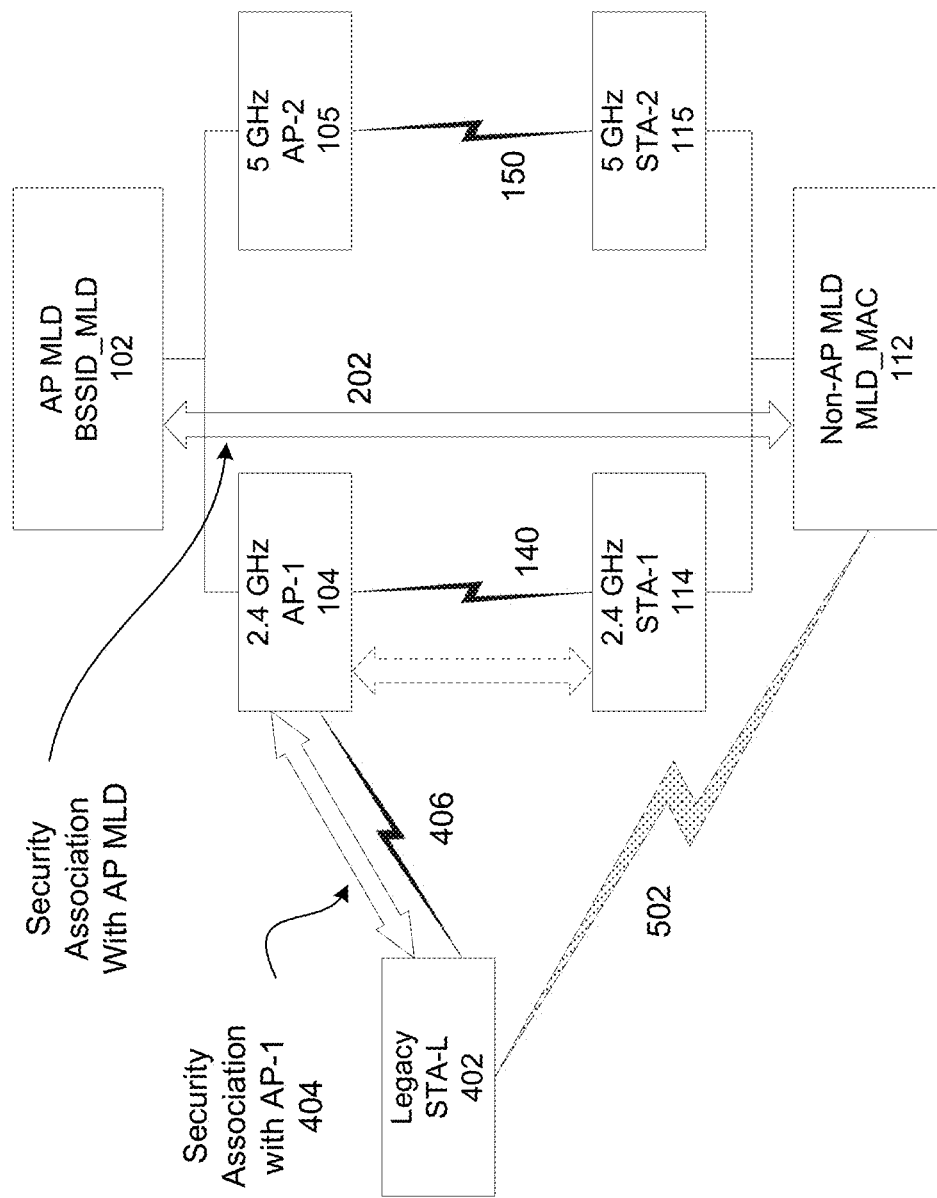
FIG. 5 shows TDLS security operations between a legacy STA and a non-AP STA, according to an embodiment of the present disclosure.

Embodiments may further provide for modifying, during the TDLS Setup stage, the TDLS handshake to negotiate a TDLS Peer Key that is bound to both the affiliated AP and AP MLD authenticator identities, as shown in FIG. 5.

FIG. 5 shows TDLS security operations between a legacy STA and a non-AP STA according to an embodiment of the present disclosure. As illustrated, the legacy STA-L 402 may establish a security association 404 with the AP-1 104. The legacy STA-L may communicate with the AP-1 104 through the link 406.

Referring to FIG. 5, the legacy STA-L 402, may determine whether it is establishing a TDLS link with an MLD or another legacy STA. If the legacy STA-L 402 receives a TDLS Discovery Response frame comprising a Link Identifier element with the peer MAC address set to the non-AP MLD 112, and an ML element that comprises the MLD AP address, the legacy STA-L 402 may use a new "ML-TDLS" AKM during the TDLS Setup frame exchanges as further described herein. Following the discovery and TDLS setup stages, the STA-L 402 may establish a TDLS link 502 with the non-AP MLD 112 as further described in reference to FIG. 6 to FIG. 8.

If the legacy STA-L 402 receives a TDLS Response frame comprising a Link Identifier element that matches the peer STA address and not including an ML element, the legacy STA-402 may use the legacy TDLS AKM during the TDLS Setup frame exchange.

Figure 6A:
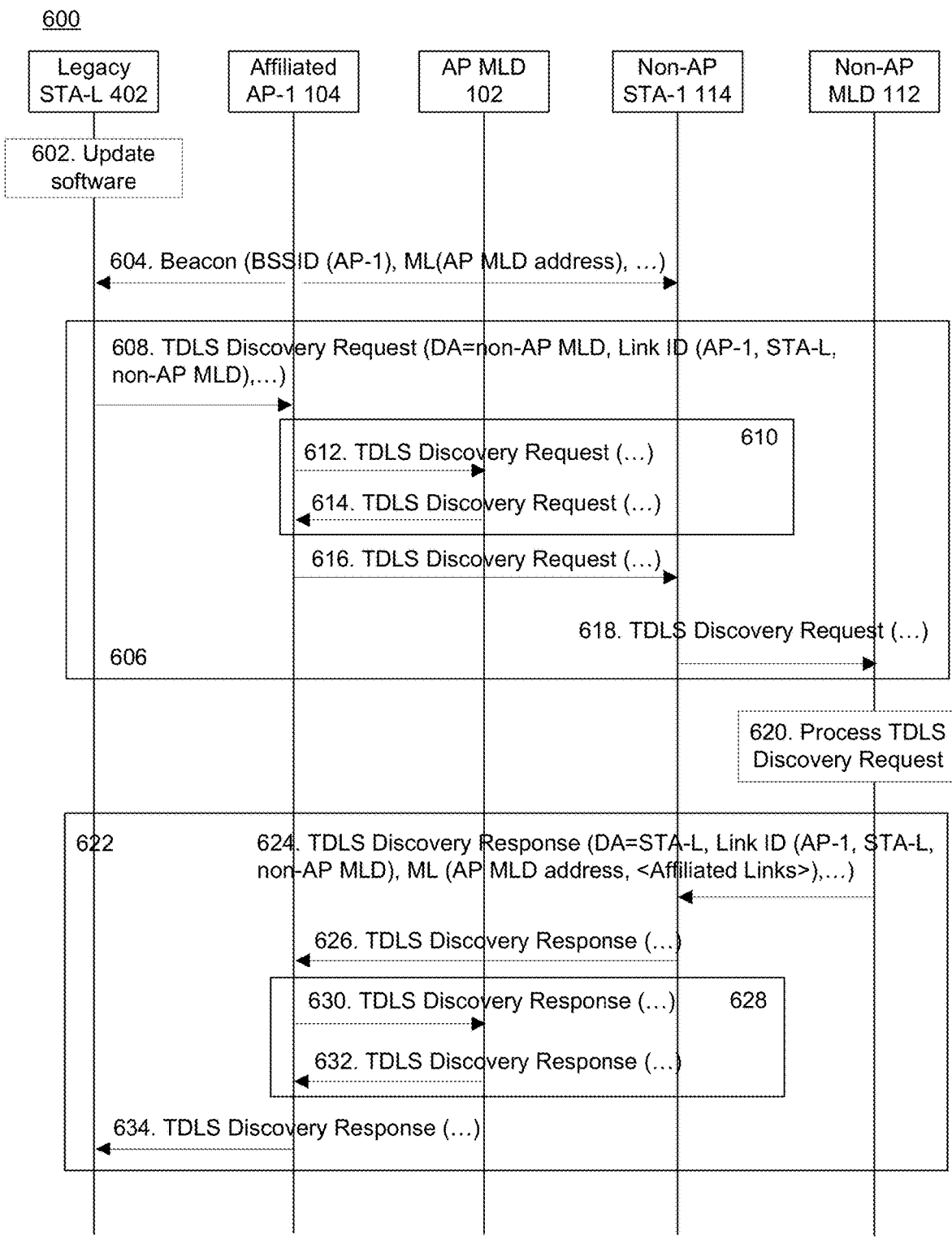
FIGS. 6A, 6B and 6C illustrate a message flow diagram of a TDLS setup between a legacy STA and a non-AP MLD, according to an embodiment of the present disclosure.
Figure 6B:
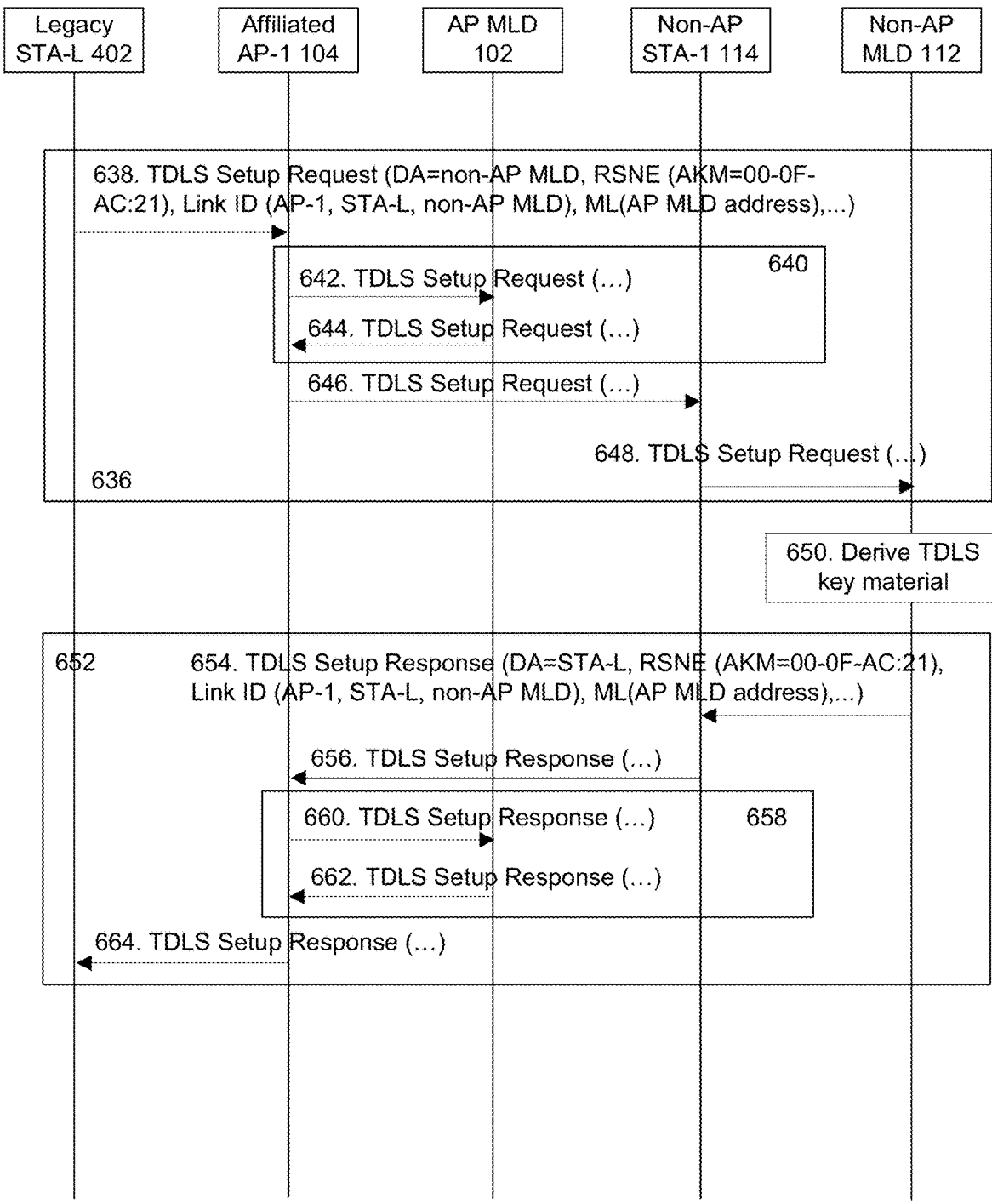
Figure 6C:
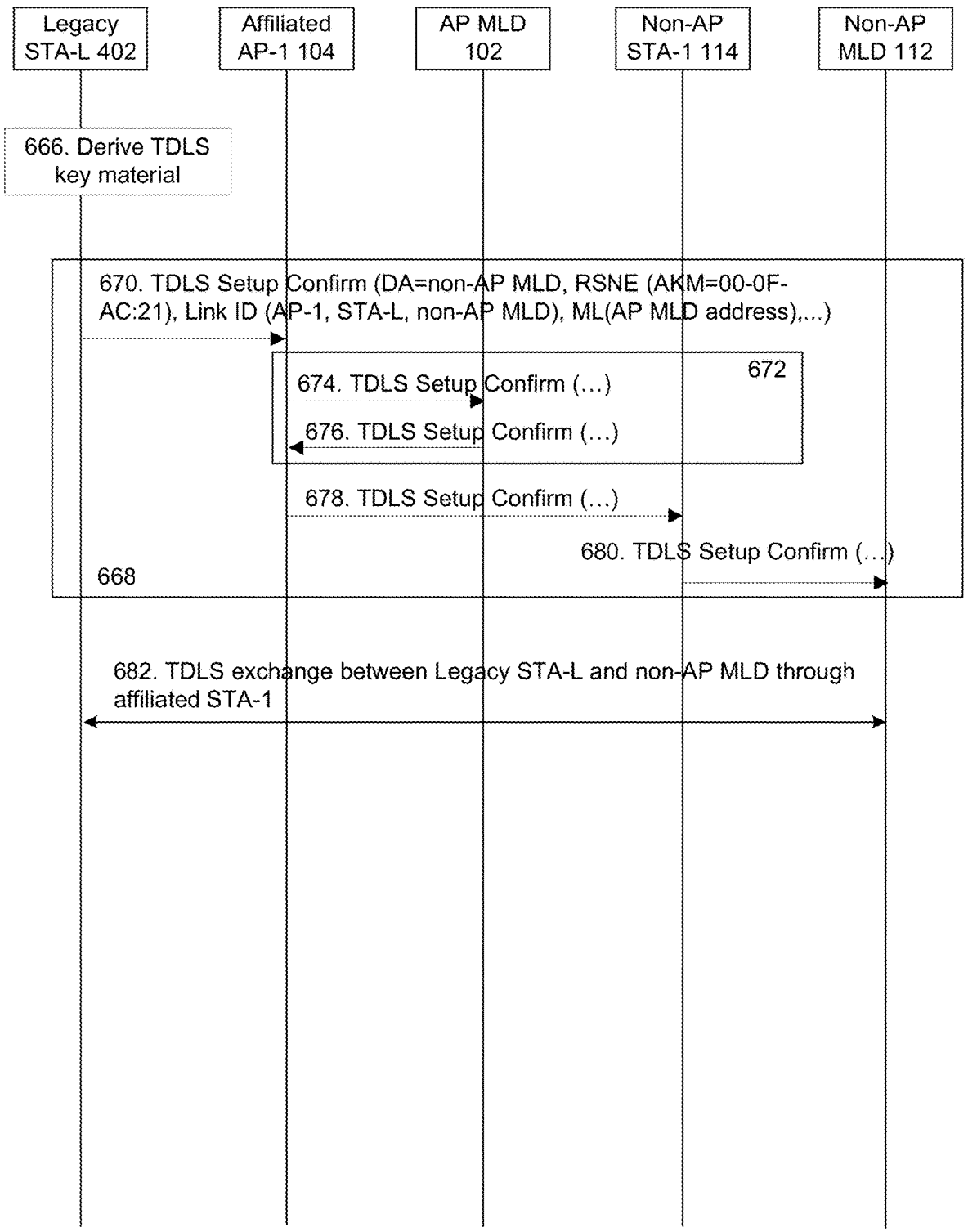

FIGS. 6A, 6B and 6C illustrate a message flow diagram of a TDLS setup between a legacy STA and a non-AP MLD, according to an embodiment of the present disclosure. The message flow diagram of FIGS. 6A, 6B and 6C may be based on the architecture illustrated in FIG. 5. A person skilled in the art may appreciate that non-AP STA-1 114 may be connected to an affiliated AP-1 104 as illustrated, without an existing security association between the two, as was described elsewhere herein.

Referring to FIGS. 6A, 6B, and 6C, the message flow 600 may enhance the TDLS discovery and the setup (handshake) stages based on the content of the messages and the way in which content may be used in these stages, as further described herein.

Referring to FIG. 6A, at 602, the legacy STA-L 402, or its software, may be updated or otherwise be configured to perform the actions contemplated in the method 600. As will be described, these actions include, among others, sending the TDLS Discovery Request message and the TDLS Setup Request, as further described herein. The TDLS Discovery Request message may include, for example, a Link Identifier identifying one or more of AP-1, STA-L, and non-AP MLD, as further described herein.

At 604, the affiliated AP-1 104 may transmit, to the legacy STA-L 402 and the non-AP STA-1 114, a beacon comprising one or more of the following information: a BSSID, and a Multi-Link Element (MLE). The BSSID may be the affiliated AP-1 MAC address. The Multi-Link Element (MLE) may comprise one or more of the AP MLD MAC Address and the affiliated AP MAC Addresses.

The legacy STA-L 402 and the non-AP STA-1 114 may receive the beacon and therefore know the addresses of each other and the AP MLD. The legacy STA-L 402 may then discover that AP-1 104 is affiliated to an AP MLD 102.

At 606, the legacy STA-L 402 may transmit a TDLS Discover Request to the Non-AP MLD 112 via the affiliated AP-1 104, the bridging process 610 and the non-AP STA-1 114, as illustrated.

The legacy STA-L 402 may, at 608, transmit an encrypted TDLS Discovery Request to the affiliated AP-1 104 of the AP MLD 102. The encrypted TDLS Discovery Request may include one or more of: a destination address (DA) set to non-AP MLD, a Link Identifier. The Link Identifier may identify one or more of AP-1, STA-L, and non-AP MLD as illustrated. The indication of non-AP MLD in the Link Identifier may indicate that one end of the link is the non-AP MLD.

As may be appreciated by a person skilled in the art, the bridging process 610 may include routing the TDLS Discovery Request to the non-AP MLD 112 through one or more of the affiliated APs (for example, AP-1 and AP-2) and the AP MLD 102.

In an embodiment, the bridging process 610, may include the affiliated AP-1 104 receiving and decrypting the encrypted TDLS Discovery Request. The affiliated AP-1 104 may determine that the TDLS Discovery Request is destined to the Non-AP MLD 112 and relay, at 612, the decrypted TDLS Discover Request to the AP MLD 102. The AP MLD 102 may re-encrypt the TDLS Discovery Request and may relay back to the AP-1 104, at 614, the re-encrypted TDLS Discovery Request for transmission to the non-AP MLD 112.

The AP-1 104 may then transmit, at 616, the re-encrypted TDLS Discovery Request to the Non-AP STA-1 114, as illustrated. The non-AP STA-1 114 may forward the re-encrypted TDLS Discovery Request, at 618, to the non-AP MLD 112.

As may be appreciated by a person skilled in the art, the bridging process 610 may occur for all message transmissions between the legacy STA-L 402 and the associated STA (e.g., non-AP STA-1 114) of the non-AP MLD 112 for the TDLS discovery and Setup (handshake) procedure.

As may be appreciated by a person skilled in the art, since legacy STA-L 402 has a security association, e.g., 404, with the AP-1 104, as described elsewhere herein, the messaging sent between the two, via the communication link, e.g., 406, may be encrypted based on a first set of keys associated with the established security association 404. Similarly, since the communication link, e.g., 140, between STA-1 114 and AP-1 104, is based on the security association 202 between the AP MLD 102 and the non-AP MLD 112, a second set of keys may be used for encrypting the messaging between the STA-1 114 and AP-1 104 or otherwise between the non-AP MLD 112 and the AP MLD 102.

At 620, the non-AP MLD 112 may decrypt and process the decrypted TDLS Discovery Request. The non-AP MLD 112 may then create a TDLS Discovery Response frame. The TDLS Discovery Response frame may include one or more of a Link Identifier element and an ML element. The Link Identifier element may have a BSSID field set to AP-1, the Initiator field set to the legacy STA-L and the Responder field set to non-AP MLD MAC address. The ML element may comprise one or more AP entity addresses.

From the BSSID field in the Link Identifier element, the non-AP MLD 112 may discover that a TDLS link with legacy STA-L may need to be established through non-AP STA-1.

At 622, the non-AP MLD 112 may transmit the TDLS Discovery Response to legacy STA-L 402 via the non-AP STA-1 114, the bridging process 628 and the affiliated AP-1 104 as illustrated.

At 624, the non-AP MLD 112 may encrypt the TDLS Discovery Response and transmit the encrypted TDLS Discover Response to the non-AP STA-1 114. The TDLS Discovery Response may include one or more of: a DA set to STA-L, a Link Identifier, and a ML element. The Link identifier may identify one or more of AP-1, STA-L, or non-AP MLD.

At 626, the non-AP STA-1 114 may transmit the encrypted TDLS Discovery Response to the affiliated AP-1 104. In an embodiment, the bridging process 628 may include, the affiliated AP-1 104 relaying, at 630, the encrypted TDLS Discovery Response to the AP MLD 102. At 632, the AP MLD 102 may decrypt the encrypted TDLS Discovery Response and relay the decrypted TDLS Discovery Response to the affiliated AP-1 104 for transmission to the legacy STA-L 402.

At 634, the affiliated AP-1 104 may re-encrypt the TDLS Discovery Response and transmit the re-encrypted TDLS Discovery Response to legacy STA-L 402.

After receiving and decrypted the re-encrypted TDLS Discovery Response, the legacy STA-L 402, may be become aware or learn that the non-AP STA-1 114 is affiliated with the non-AP MLD 112.

As may be appreciated by a person skilled in the art, actions performed at 606 to 634 may be referred to as the TDLS discovery stage or procedure.

Referring to FIG. 6B, at 636, the legacy STA-L 402 may transmit a TDLS Setup Request to the non-AP MLD 112 via the affiliated AP-1 104, a bridging process 640 and the non-AP STA-1 114 as illustrated.

The legacy STA-L 402 may, at 638, transmit an encrypted TDLS Setup Request to the affiliated AP-1 104 of the AP MLD 102. The TDLS Setup Request may include one or more of: a DA set to non-AP MLD, a Robust Security Network Element (RSNE) (e.g., RSNE (AKM=00-0F-AC: 21)), a Link Identifier (Link ID) and an ML element (MLE) as illustrated. The Link Identifier may identify one or more of AP-1, STA-L, and non-AP MLD. The MLE may comprise one or more of AP entity addresses.

Within the TDLS Setup Request message, the legacy STA-L 402 may use an enhanced Multi-Link TPK (TDLS Peer Key) authentication and key management (AKM) suite, which is exchanged within the RSNE. Since the legacy STA-L 402 may know that it will establish a TDLS connection with a non-AP MLD, the legacy STA-L 402 may use the new AKM. An example embodiment of the new AKM suite definition is illustrated in FIG. 7 and further described herein.

In some embodiments, the enhanced AKM suite may be required because the TPK derivation may involves multiple MAC Addresses within the Link Identifier sub-field. For example, the BSSID field may be set to AP-1, the Initiator field may be set to the legacy STA-L, and the Responder field may be set to non-AP MLD.

As may be appreciated by a person skilled in the art, the bridging process 640 may be similar to the bridging process 610. The bridging process 640 may include routing the TDLS Setup Request to the non-AP MLD through one or more of the affiliated APs (for example, AP-1 and AP-2) and the AP MLD 102.

In some embodiments, the bridging process 640, may include the affiliated AP-1 104 receiving and decrypting the encrypted TDLS Setup Request. The affiliated AP-1 104 may relay, at 642, the decrypted TDLS Setup Request to the AP MLD 102. The AP MLD 102 may re-encrypt the decrypted TDLS Setup Request and may relay to the AP-1 104, at 644, a re-encrypted TDLS Setup Request for transmission to the non-AP MLD 112 via the non-AP STA-1 114.

At 646, the AP-1 104 may then transmit the re-encrypted TDLS Setup Request to the non-AP STA-1 114, as illustrated. The non-AP STA-1 114 may forward the re-encrypted TDLS Setup Request, at 648, to the non-AP MLD 112.

At 650, the non-AP MLD 112 may receive and decrypt the re-encrypted TDLS Setup Request message comprising the link identifier. The non-AP MLD 112 may derive the TPK (TDLS key material) using Equation (1) as shown below.

$$\text{TPK} = \text{KDF-Hash-Length}(\text{TPK-Key-Input}, \text{``TDLS PMK''}, \min(\text{MAC}\_I, \text{MAC}\_R) \| \max(\text{MAC}\_I, \text{MAC}\_R) \| \text{BSSID (AP-1)} \| \text{AP MLD MAC Address}) \quad \text{Equation (1)}$$

Referring to Equation (1), the MAC_I and MAC_R may be set to the legacy STA-L MAC address and the non-AP MLD MAC address. The TPK-Key-Input may be defined according to Equation (2) below.

$$\text{TPK-Key-Input} = \text{Hash}(\min(S\text{Nonce}, A\text{Nonce}) \| \max(S\text{Nonce}, A\text{Nonce})) \quad \text{Equation (2)}$$

As may be appreciated by a person skilled in the art, equation 1 is an enhancement or an update to existing TPK derivation function, which may be used by the new AKM.

At 652, the non-AP MLD 112 may transmit a TDLS Setup Response to legacy STA-L 402 via the non-AP STA-1 114, a bridging process 658, and the affiliated AP-1 104 as illustrated.

At 654, the non-AP MLD 112 may encrypt the TDLS Setup Response and transmit the encrypted TDLS Setup Response to the non-AP STA-1 114. The TDLS Setup Response may include the link identifier and the new AKM Suite identifier (indicated by e.g., RSNE (AKM=00-0E-AC: 21)) as illustrated. The TDLS Setup Response may further indicate one or more of: a DA indicating STA-L; a link ID indicating one or more of AP-1, STA-L, non-AP MLD; and a ML indicating one or more of AP entity addresses (e.g., AP MLD address).

At 656, the non-AP STA-1 114 may transmit the encrypted TDLS Setup Response to the affiliated AP-1 104. The affiliated AP-1 104 and the AP MLD 102 may perform the bridging process 658, which may be similar to the bridging process 628.

In an embodiment, the bridging process 658 may include at 660, the affiliated AP-1 104 relaying the encrypted TDLS Setup Response to the AP MLD 102. At 662, the AP MLD 102 may decrypt the encrypted TDLS Setup Response and relay the decrypted TDLS Setup Response to the affiliated AP-1 104 for transmission to the legacy STA-L 402.

At 664, the affiliated AP-1 104 may re-encrypt the TDLS Setup Response and transmit the re-encrypted TDLS Setup Response to legacy STA-L 402.

Referring to FIG. 6C, at 666, the legacy STA-L 402 may receive and decrypt the re-encrypted TDLS Setup Response. The legacy STA-L 402 may then derive the TPK (TDLS Key material) using the equation (1) shown elsewhere herein.

At 668, the legacy STA-L 402 may transmit an encrypted TDLS Setup Confirm message to the non-AP MLD 112 via the affiliated AP-1 104, a bridging process 672, and the non-AP STA-1 114 as illustrated. The TDLS Setup Confirm message may include one or more of the new Link Identifier and an AKM Suite identifier (indicated by e.g., RSNE (AKM=00-0E-AC:21)) as illustrated. The TDLS Setup Confirm message may further indicate one or more of: DA indicating non-AP MLD; a link ID indicating one or more of AP-1, STA-L, and non-AP MLD, and ML indicating one or more of AP entity addresses (e.g., AP MLD address).

The legacy STA-L 402 may transmit, at 670, an encrypted TDLS Setup Confirm message to the affiliated AP-1 104. At 672, the affiliated AP-1 104 and the AP MLD 102 may perform the bridging process similar to the bridging process 610 and 640.

In an embodiment, the bridging process 672, may include the affiliated AP-1 104 receiving and decrypted the encrypted TDLS Setup Confirm message. The affiliated AP-1 104 may relay, at 674, the decrypted TDLS Setup Confirm message to the AP MLD 102. The AP MLD 102 may re-encrypt the TDLS Setup Confirm message and may relay to the AP-1 104, at 676, the re-encrypted TDLS Setup Confirm message for transmission to the non-AP MLD 112.

The AP-1 104 may then transmit, at 678, the re-encrypted TDLS Setup Confirm message to the Non-AP STA-1 114, as illustrated. The non-AP STA-1 114 may forward the re-encrypted TDLS Setup Confirm message, at 680, to the non-AP MLD 112.

The non-AP MLD 112 may then receive and decrypt the re-encrypted TDLS Confirm message. The TDLS Setup Confirm message may complete the TPK (TDLS Peer Key) handshake. The actions performed at 636 to 680 may be referred to as the TDLS Setup (handshake) stage or procedure.

Following the completion of the TPK handshake, the TDL (Tunneled Direct Link) is presumed to have been established, and the legacy STA-L 402 may communicate directly, at 682, with the non-AP MLD 112 through the non-AP STA-1 114. Once the TDL (Tunneled Direct Link) has been established, frames transmitted by the legacy STA-L may be received by the affiliated non-AP STA-1 114. Accordingly, the legacy STA-L 402 and the non-AP MLD 112 may then use the established TDL for traffic between the peers (legacy STA-L 402 and the non-AP MLD 112), rather than using the links (e.g., 406 and 140) associated with the affiliated AP-1 104.

As may be appreciated by a person skilled in the art, in order to support compatibility with legacy devices, it is useful for the communication between the legacy STA-L and the affiliated STA-1 to mimic the communication on the LAN. Accordingly, in some embodiments, the non-AP MLD may use the non-AP MLD address instead of the affiliated AP MAC address. As such, frames transmitted by non-AP MLD 112 to the legacy STA-L 402 may be set as follows: the RA (receiver address) may be set to legacy STA-L, the TA (transmitter address) may be set to non-AP MLD, and the DA (destination address) may be set to the legacy STA-L.

Similarly, in some embodiments, frames transmitted by the legacy STA-L 402 destined to the non-AP MLD 112 may be set as follows: the RA may be set to the non-AP MLD, the TA may be set to the legacy STA-L, and the DA may be set to the non-AP MLD.

In some embodiments, beacon 604 may be replaced with IP discovery. As a non-limiting example, a user would launch an app (e.g. YouTube) on their phone and decide to cast to their TV, for example using a Chromecast device. Through discovery on the IP network, the phone would know the IP address and MAC address of the Chromecast device. The phone would then use the MAC address of the Chromecast device to send the above described TDLS Discovery Request with the link identifier information. The Chromecast device would then receive the TDLS Discovery Request, and respond with the above described TDLS Discovery Response.

FIG. 7 illustrates an authentication and key management (AKM) suite, according to an embodiment of the present disclosure. The AKM suite 700 may include one or more assigned values, indicators or definitions of: Organizationally Unique Identifier (OUI) (e.g., 00-0F-AC) Suite Type, Authentication, Key Management, Key Derivation, and Authentication Numbers as illustrated, as well as other parameters, for example as defined in IEEE 802.11-2020.

As an example, a Suite Type value of 21 may be assigned. The Authentication indicator or definition may refer to the "ML-TDLS". The Key Management indicator or definition may refer to "ML-TPK Handshake". A person skilled in the art may appreciate that other values may be assigned to the Suite Type and other names may be used to indicate or define the Authentication and Key Management.

Figure 8A:
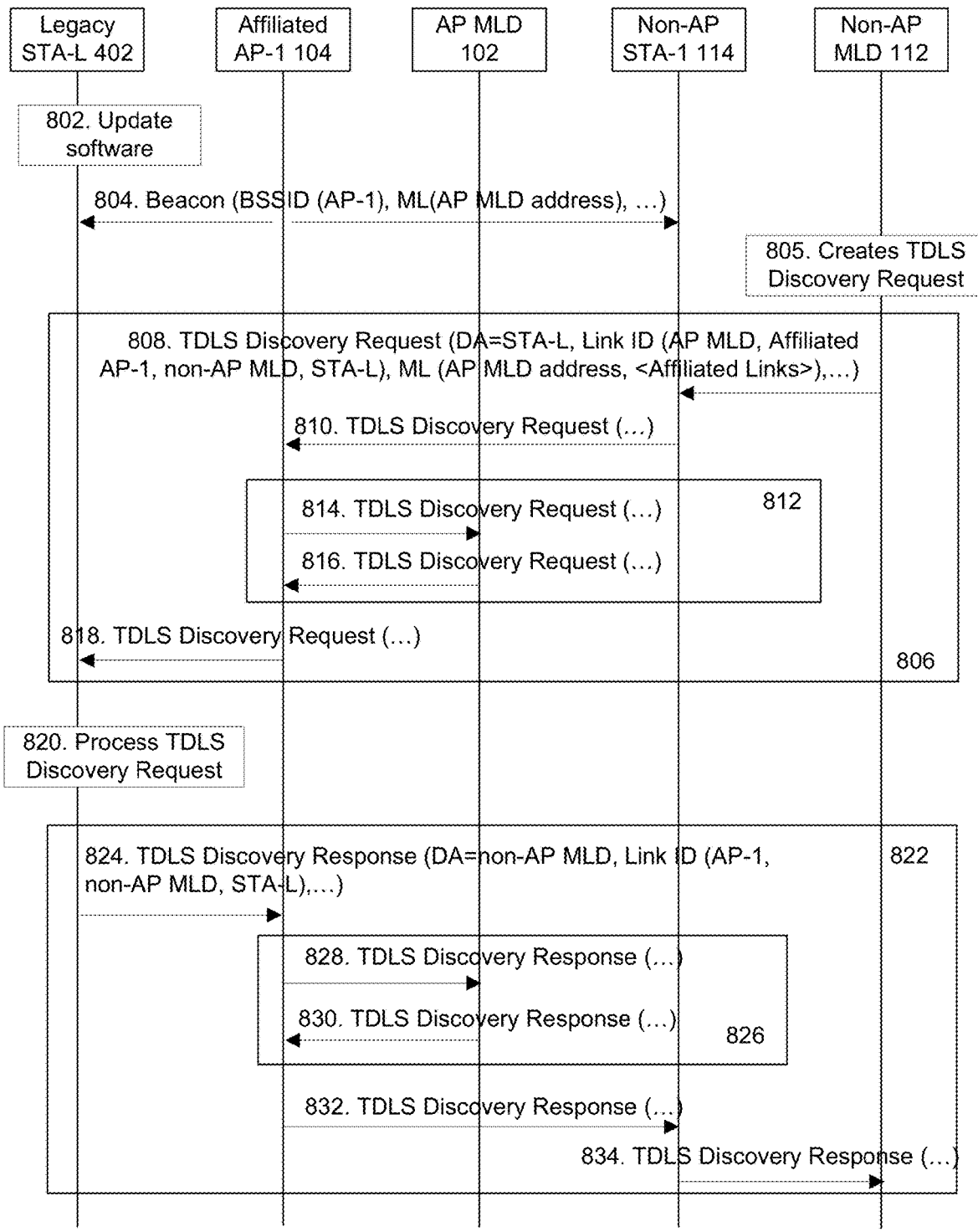
FIGS. 8A, 8B, and 8C illustrate a message flow diagram of a TDLS setup between a legacy STA and a non-AP MLD, according to another embodiment of the present disclosure.
Figure 8B:
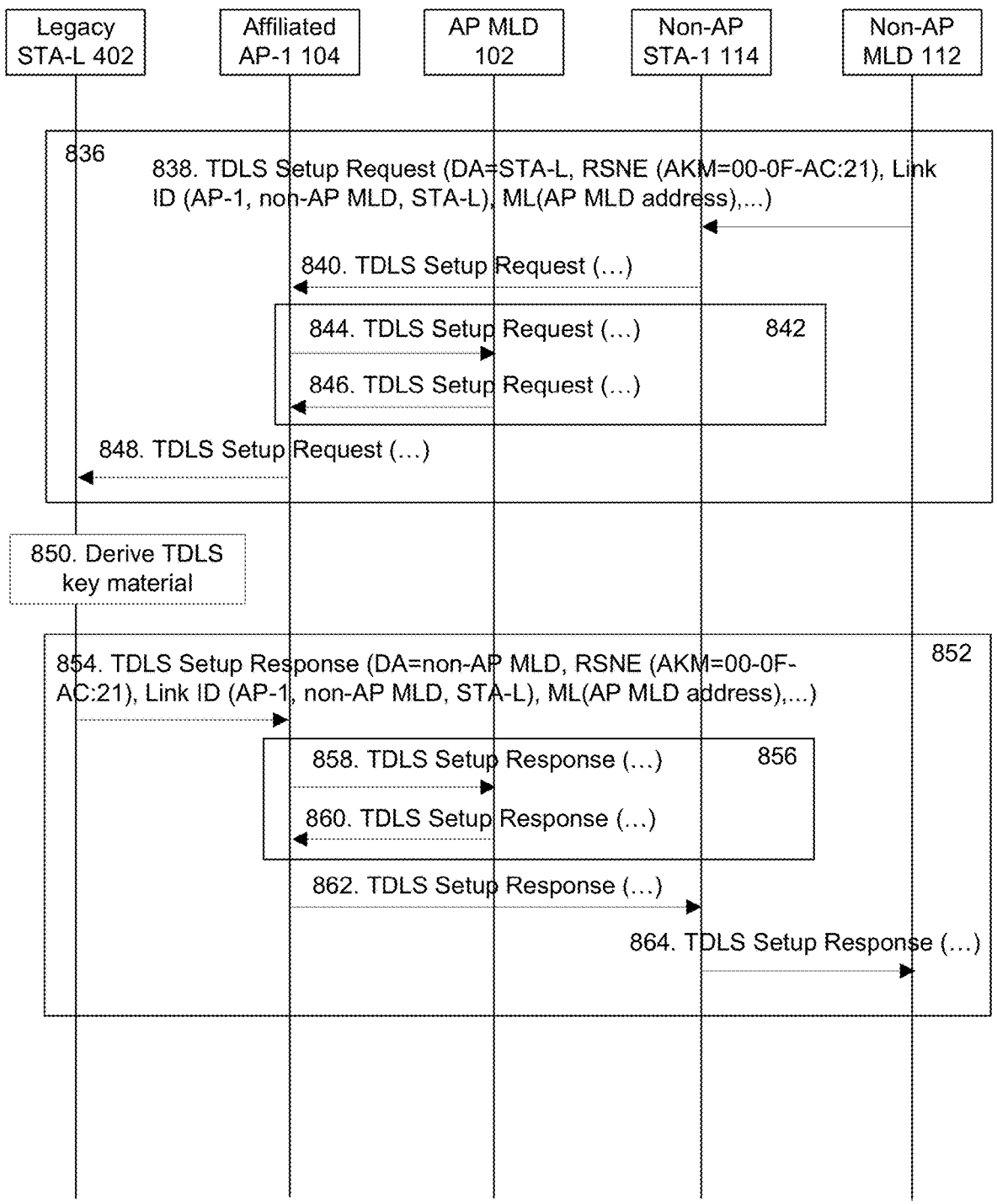
Figure 8C:
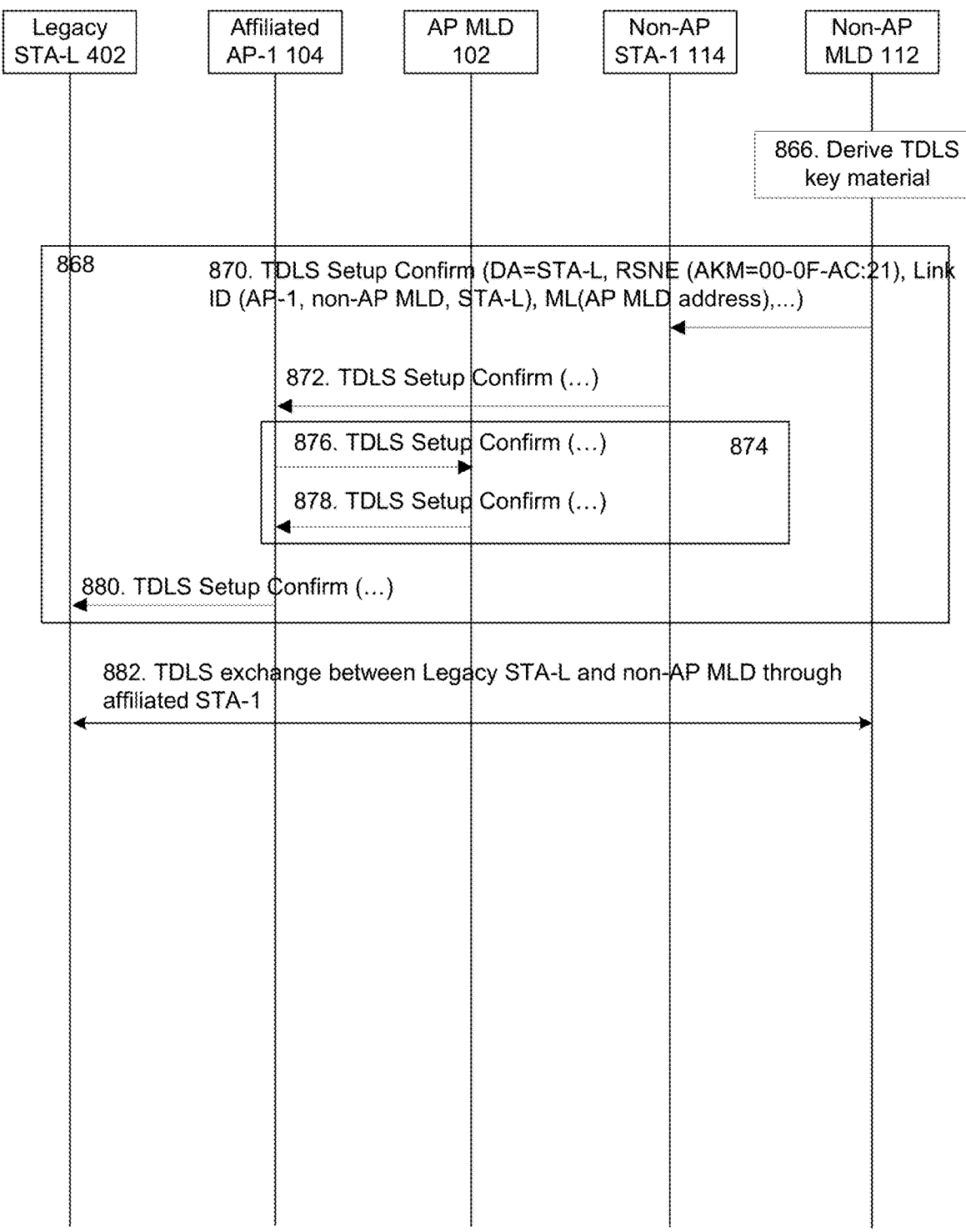

FIGS. 8A, 8B, and 8C illustrate a message flow diagram of a TDLS setup between a legacy STA and a non-AP MLD, according to another embodiment of the present disclosure. A person skilled in the art may appreciate that FIGS. 8A, 8B and 8C may be similar to FIGS. 6A, 6B, and 6C, however, the TDLS Discovery and Setup (handshake) procedures are initiated, in FIGS. 8A, 8B and 8C, by the non-AP MLD 112 rather than the legacy STA-L 402 (which is the case for FIGS. 6A, 6B and 6C). In other words, in FIGS. 8A, 8B and 8C, the TDLS Discovery Request message and the TDLS Setup Request message are initiated and transmitted by the non-AP MLD as illustrated and further described herein.

Similar to message flow 600, the message flow 800 may enhance the TDLS discovery and the setup (handshake) stages based on the content of the messages and the way in which content may be used in these stages, as further described herein.

Referring to FIG. 8A, at 802, the legacy STA-L 402 or its software may be updated or otherwise be configured to perform the actions contemplated in the method 800. As will be described, these actions include, among others, sending TDLS Discover Response message and the TDLS Setup Response, as further described herein.

At 804, the affiliated AP-1 104 may transmit, to the legacy STA-L 402 and the non-AP STA-1 114, a beacon comprising one or more of the following information: a BSSID and a Multi-Link Element (MLE). The BSSID may be the affiliated AP-1 MAC address. The Multi-Link Element (MLE) may comprise one or more of the AP MLD MAC Address and affiliated AP MAC Addresses.

The legacy STA-L 402 and the non-AP STA-1 114 may receive the beacon and therefore know the addresses of each other and the AP MLD. It is noted that in some embodiments, IP discovery, as described above can be used instead of beacon 804.

At 805, the non-AP MLD 112 may create a TDLS Discovery Request. TDLS Discovery Request may include one or more of: a destination address (DA) set to STA-L, a Link Identifier, and a Multi-Link Element (MLE). The Multi-Link Element (MLE) may comprise one or more of the AP MLD MAC Address and affiliated AP MAC Addresses. The Link Identifier may identify one or more of AP MLD, Affiliated AP-1, non-AP MLD, and STA-L as illustrated.

At 806, the non-AP MLD 112 may transmit the TDLS Discover Request to the legacy STA-L 402 via the non-AP STA-1 114, a bridging process 812 and the affiliated AP-1 104 as illustrated.

At 808, the non-AP MLD 112 may encrypt the TDLS Discovery Request and transmit the encrypted TDLS Discovery Request to the non-AP STA-1 114. At 810, the non-AP STA-1 114 may transmit the encrypted TDLS Discovery Request to the affiliated AP-1 104.

At 812, the affiliated AP-1 104 and the AP MLD 102 may perform the bridging process 812. In an embodiment, the bridging process 812 may include routing the TDLS Discovery Request to the legacy STA-L 402 through one or more of the affiliated APs (for example, AP-1 and AP-2) and the AP MLD 102.

In an embodiment, the bridging process 812, may include, the affiliated AP-1 104 relaying, at 814, the encrypted TDLS Discovery Request to the AP MLD 102. The AP MLD 102 may decrypt the encrypted TDLS Discovery Request and relay it back, at 816, to the affiliated AP-1 104.

At 818, the affiliated AP-1 104 may re-encrypt the decrypted TDLS Discovery Request and transmit the re-encrypted TDLS Discovery Request to the legacy STA-L 402 as illustrated.

At 820, the legacy STA-L 402 may decrypt and process the decrypted TDLS Discovery Request. The legacy STA-L 402 may then become aware or learn that the non-AP STA-1 114 is affiliated with the non-AP MLD 112 and that AP-1 104 is an AP affiliated with the AP MLD 102.

The legacy STA-L 402 may then create a TDLS Discovery Response frame. The TDLS Discovery Response frame may include one or more of: a modified Link Identifier element and an ML element. The modified Link Identifier element may have a BSSID field set to AP-1, the Initiator field set to the non-AP MLD and the Responder field set to AP-1 MAC address. The ML element may comprise one or more AP entity addresses.

At 822, the legacy STA-L 402 may transmit the TDLS Discovery Response to non-AP MLD 112 via the affiliated AP-1 104, the bridging process 826 and the non-AP STA-1 114 as illustrated.

At 824, the legacy STA-L 402 may encrypt the TDLS Discovery Response and transmit the encrypted TDLS Discover Response to the affiliated AP-1 104. The TDLS Discovery Response may include one or more of: a DA set to non-AP MLD, a Link Identifier, and a ML element. The Link identifier may identify one or more of AP-1, STA-L, or non-AP MILD.

At 826, the affiliated AP-1 104 and the AP MLD 102 may perform the bridging process. In an embodiment, the bridging process 826 may include at 828, the affiliated AP-1 104 decrypting the encrypted TDLS Discovery Response and relaying it to the AP MLD 102. At 830, AP MLD 102 may re-encrypt the decrypted TDLS Discovery Response and relay it back to affiliated AP-1 104 for transmission to the non-AP MLD 112 via the non-AP STA-1 114.

The affiliated AP-1 104, at 832, may transmit the re-encrypted TDLS discovery response to the non-AP STA-1 114. At 834, the non-AP STA-1 114 may forward the re-encrypted TDLS Discovery Response to the non-AP MLD 112. The non-AP MLD 112 may receive and decrypt the re-encrypted TDLS Discovery Response.

As may be appreciated by a person skilled in the art, actions performed at 806 to 834 may be referred to as the TDLS discovery stage or procedure.

Referring to FIG. 8B, at 836, the non-AP MLD 112 may transmit a TDLS Setup Request to legacy STA-L 402, via the non-AP STA-1 114, the bridging process 842 and the affiliated AP-1 104 as illustrated. The TDLS Setup Request may include one or more of: a DA set to legacy STA-L, a Robust Security Network Element (RSNE) (e.g., RSNE (AKM=00-0E-AC:21)), a Link Identifier and an MLE as illustrated. The Link Identifier may identify one or more of AP-1, STA-L, and non-AP MLD. The MLE may comprise one or more of AP entity addresses. The non-AP MLD 112 may store the affiliated STA link address, based on the BSSID received in the link ID.

Within the TDLS Setup Request message, the non-AP MLD 112 may use the enhanced Multi-Link TPK AKM suite, as described herein with reference to FIG. 7. As discussed elsewhere herein, the new AKM suite may be required because the TPK derivation may involves multiple MAC Addresses within the Link Identifier sub-field. In an example in which the initiator is the non-AP MLD, the BSSID field may be set to AP-1, the Initiator field may be set to the non-AP MLD, and the Responder field may be set to legacy STA-L.

The non-AP MLD 112 may, at 838, transmit an encrypted TDLS Setup Request to the non-AP STA-1 114. The non-AP STA-1 114 may transmit, at 840, the encrypted TDLS Setup Request to the affiliated AP-1 104.

At 842, the affiliated AP-1 104 and the AP MLD 102 may perform the bridging process. In some embodiments, the bridging process 842, may include, the affiliated AP-1 104 relaying, at 844, the encrypted TDLS Setup Request to the AP MLD 102. The AP MLD 102 may decrypt the TDLS Setup Request and may relay to the AP-1 104, at 846, the decrypted TDLS Setup Request for transmission to the legacy STA-L 402.

At 848, the AP-1 104 may re-encrypt the decrypted TDLS Setup Request and transmit the re-encrypted TDLS Setup Request to the legacy STA-L 402, as illustrated.

At 850, the legacy STA-L 402 may receive and decrypt the re-encrypted TDLS Setup Request message comprising the link identifier. The legacy STA-L 402 may derive the TPK (TDLS key material) using Equation (1) described herein.

At 852, the legacy STA-L 402 may transmit a TDLS Setup Response to non-AP MLD 112 via the affiliated AP-1 104, a bridging process 856, and the non-AP STA-1 114 as illustrated.

At 854, the legacy STA-L 402 may encrypt a TDLS Setup Response and transmit the encrypted TDLS Setup Response to the affiliated AP-1 104. The TDLS Setup Response may include one or more of the link identifier and the new AKM Suite identifier (indicated by e.g., RSNE (AKM=00-0E-AC: 21)) as illustrated. The TDLS Setup Response may further indicate one or more of: DA indicating non-AP MLD; Link ID indicating one or more of AP-1, non-AP MLD, STA-L; and ML indicating one or more of AP entity addresses (e.g., AP MLD address).

The affiliated AP-1 104 and the AP MLD 102 may then perform the bridging process 856. In an embodiment, the bridging process 856 may include at 858, the affiliated AP-1 104 decrypting the encrypted TDLS Setup Response and relaying it to AP MLD 102. At 860, the AP MLD 102 may re-encrypt the TDLS Setup Response and relay it back to the affiliated AP-1 104 for transmission to the non-AP STA-1 114.

At 862, the affiliated AP-1 104 may transmit the re-encrypted TDLS Setup Response to the non-AP STA-1 114. At 864, the non-AP STA-1 114 may transmit the received re-encrypted TDLS Setup Response to the non-AP MLD 112.

Referring to FIG. 8C, at 866, the non-AP MLD 112 may receive and decrypt the re-encrypted TDLS Setup Response. The non-AP MLD 112 may then derive the TPK (TDLS Key material) using the equation (1) shown elsewhere herein.

At 868, the non-AP MLD 112 may transmit an encrypted TDLS Setup Confirm message to the legacy STA-L 402 via the non-AP STA-1 114, a bridging process 874, and the affiliated AP-1 104 as illustrated. The TDLS Setup Confirm message may include one or more of the link identifiers and an AKM Suite identifier (indicated by e.g., RSNE (AKM=00-0E-AC:21)) as illustrated. The TDLS Setup Confirm message may further indicate one or more of: DA indicating STA-L; a link ID indicating one or more of AP-1, non-AP MLD, and STA-L; and ML indicating one or more of AP entity addresses (e.g., AP MLD address).

At 870, the non-AP MLD 112 may transmit the encrypted TDLS Setup Confirm message to the non-AP STA-1 114. AT 872, the non-AP STA-1 114 may transmit the encrypted TDLS Setup Confirm message to the affiliated AP-1 104.

At 874, the affiliated AP-1 104 and the AP MLD 102 may perform the bridging process. In an embodiment, the bridging process 874, may include the affiliated AP-1 104 relaying, at 876, the encrypted TDLS Setup Confirm message to the AP MLD 102. The AP MLD 102 may decrypt the TDLS Setup Confirm message and relay, at 878, it back to the affiliated AP-1 104.

At 880, the affiliated AP-1 104 may re-encrypt the decrypted TDLS Setup Confirm message and transmit to legacy STA-L 402. The legacy STA-L 402 may then receive and decrypt the re-encrypted TDLS Confirm message.

The TDLS Setup Confirm message may complete the TPK (TDLS Peer Key) handshake. The actions performed at 836 to 880 may be referred to as the TDLS Setup (handshake) stage or procedure.

Following the completion of the TPK handshake, the TDL (Tunneled Direct Link) is presumed to have been established, and the legacy STA-L 402 may communicate directly, at 882, with the non-AP MLD 112 through the non-AP STA-1 114.

Figure 9:
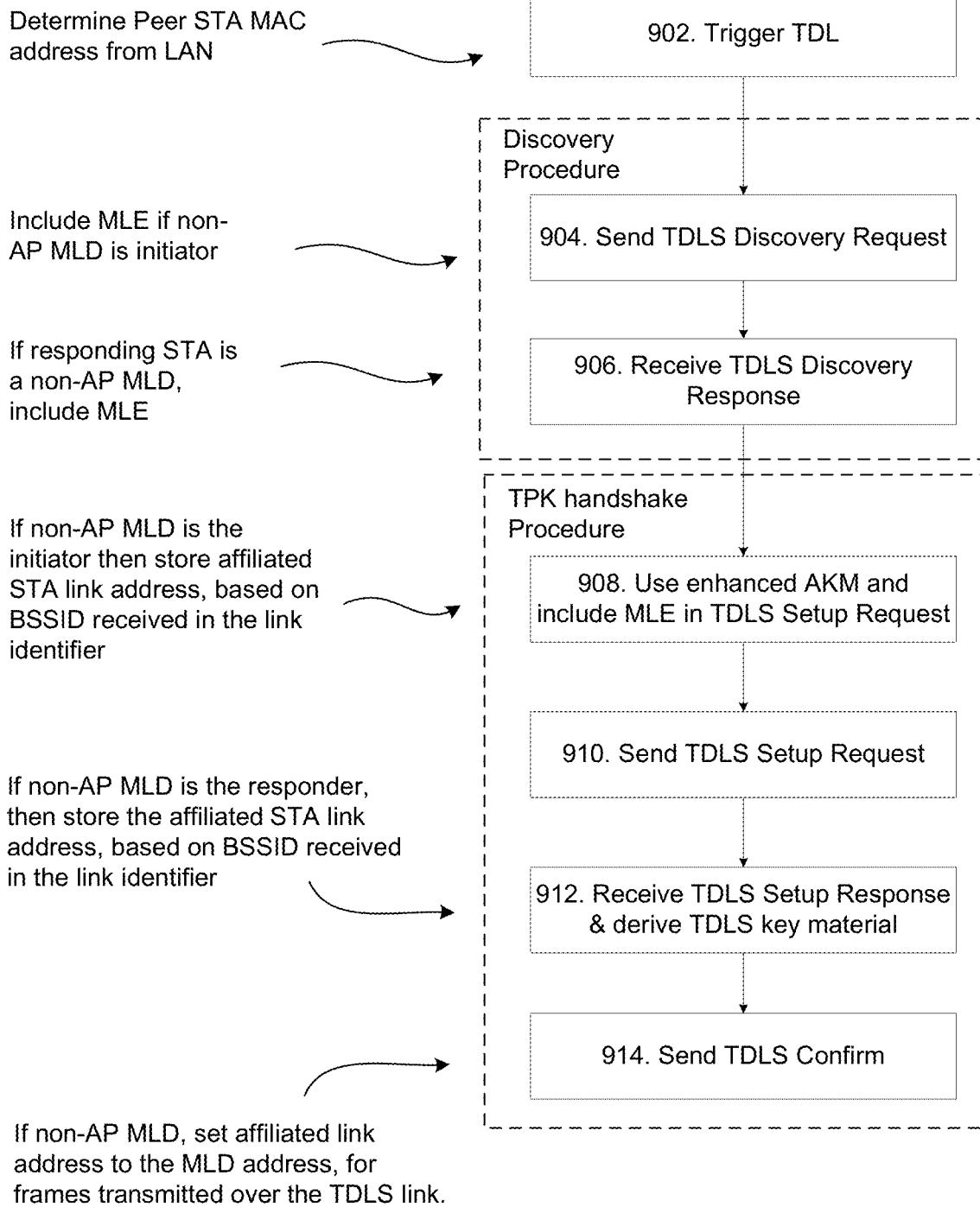
FIG. 9 illustrates a flow chart of the TDLS Setup procedure, according to an embodiment of the present disclosure.

FIG. 9 illustrates a flow chart of the TDLS Setup procedure, according to an embodiment of the present disclosure. The procedure 900 may include a discovery procedure, e.g., 904 and 906, and a TPK handshake procedure, e.g., 908-914, from the point of view a STA as further described herein. The procedure 900 may be from a point of view of either the Legacy STA-L 402 or the non-AP MLD 112. In the case of legacy STA-L 402, the procedure 900 reflects the TDL setup of FIGS. 6A, 6B and 6C as described herein. And in the case non-AP MLD 112, the procedure 900 reflects the TDL setup of FIGS. 8A, 8B, and 8C as described herein.

The procedure 900 may begin at 902 in which the STA may determine a peer STA MAC address from LAN as a trigger for TDL. In the case of legacy STA-L 402, 902 is reflected at 604 of FIG. 6A. And in the case non-AP MLD 112, 902 is reflected at 804 of FIG. 8A.

The procedure 900 may further include, at 904, the STA sending a TDLS Discovery Request. In the case of legacy STA-L 402, 904 is reflected at 606 of FIG. 6A. And in the case non-AP MLD 112, 904 is reflected at 806 of FIG. 8A, in which the TDLS Discovery Request includes the Multi-Link Element (MLE).

The procedure 900 may further include, at 906, the STA receiving a TDLS Discovery Response. In the case of legacy STA-L 402, 906 is reflected at 634 of FIG. 6A, in which case the TDLS Discover Response includes an MLE. And in the case non-AP MLD 112, 906 is reflected at 834 of FIG. 8A.

As may be appreciated by a person skilled in the art, actions performed at 904 and 906 may be referred to as the discovery procedure.

The procedure 900 may further include, at 908, the STA using the enhanced AKM and including the MLE in the TDLS Setup Request. The procedure 900 may further include, at 910, the STA sending the TDLS Setup Request. In the case of legacy STA-L 402, 908 and 910 may be reflected at 636 of FIG. 6B. And in the case non-AP MLD 112, 908 and 910 may be reflected at 836 of FIG. 8B, in which case the non-AP MLD 112 may store the affiliated STA link address, based on the BSSID received in the link ID.

The procedure 900 may further include, at 912, the STA receiving the TDLS Setup Response and deriving TDLS key material. In the case of legacy STA-L 402, 912 may be reflected at 664 and 666 of FIGS. 6B and 6C, in which case the legacy STA-L 402 may store the affiliated STA link address, based on the BSSID received in the link ID. And in the case non-AP MLD 112, 912 may be reflected at 864 and 866 of FIGS. 8B and 8C.

The procedure 900 may further include, at 914, the STA sending a TDLS Setup Confirm message. In the case of legacy STA-L 402, 914 may be reflected at 668 of FIG. 6C. And in the case non-AP MLD 112, 914 may be reflected at 868 of FIG. 8C, in which case the non-AP MLD 112 may set the affiliated link address to the MLD address, for frames transmitted over the TDLS link.

Embodiments may enhance an AP MLD's ability to correctly support TDLS security (key derivation) to allow the AP MLD to support features such as screen sharing between a legacy screen (e.g., 802.11ax) and an 802.11be mobile device. Supporting TDLS security for allowing features such as screen sharing may be essential for services such as Chromecast.

Embodiments may permit capability and usability of TDLS security within an 802.11be multi-link device and an 802.11 legacy device as described herein.

As discussed herein, embodiments may provide for TDLS Peer Key derivation between a legacy STA (e.g., 802.11ax) and a ML STA (e.g., 802.11be). The TDLS Peer Key derivation may use two authenticator identities, rather than one as described herein.

Embodiments may further provide for an enhanced Authentication and Key Management suite as described herein. Embodiments may further provide for allowing a legacy STA to determine that an AP (and an affiliated AP) are ML TDLS enabled, based on, for example, advertisements from the AP MLD (and affiliated AP) as described herein.

Embodiments may further provide for establishing a TDL between a legacy STA and a non-AP MLD for allowing traffic flow from the legacy STA and the non-AP MLD through an affiliated non-AP STA as described herein.

Figure 10:
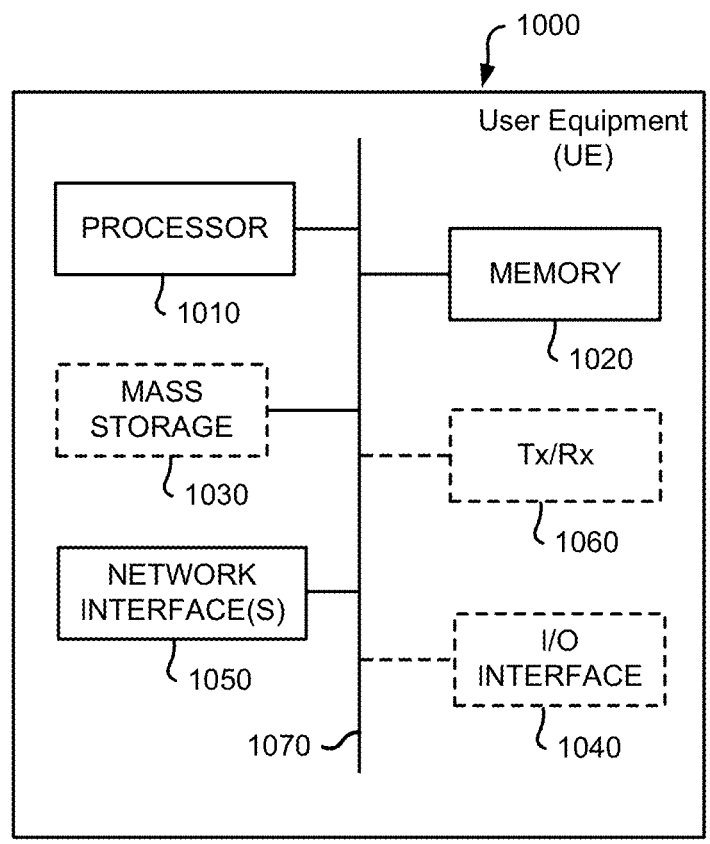
FIG. 10 is a schematic diagram of a user equipment (UE) that may perform any or all of operations of the above methods and features explicitly or implicitly described herein, according to different embodiments of the present invention.

FIG. 10 is a schematic diagram of UE 1000 that may perform any or all of operations of the above methods and features explicitly or implicitly described herein, according to different embodiments of the present invention. For example, a computer equipped with network function may be configured as UE 1000. As may be appreciated by a person skilled in the art, the UE 1000 can represent one or more entities described herein, for example, an AP, an AP MLD, an affiliated AP, a non-AP MLD, a STA, an affiliated STA, a legacy STA, or the like.

As shown, the UE 1000 may include a processor 1010, such as a Central Processing Unit (CPU) or specialized processors such as a Graphics Processing Unit (GPU) or other such processor unit, memory 1020, non-transitory mass storage 1030, input-output interface 1040, network interface 1050, and a transceiver 1060, all of which are communicatively coupled via bi-directional bus 1070. According to certain embodiments, any or all of the depicted elements may be utilized, or only a subset of the elements. Further, UE 1000 may contain multiple instances of certain elements, such as multiple processors, memories, or transceivers. Also, elements of the hardware device may be directly coupled to other elements without the bi-directional bus. Additionally, or alternatively to a processor and memory, other electronics, such as integrated circuits, may be employed for performing the required logical operations.

The memory 1020 may include any type of non-transitory memory such as static random access memory (SRAM), dynamic random access memory (DRAM), synchronous DRAM (SDRAM), read-only memory (ROM), any combination of such, or the like. The mass storage element 1030 may include any type of non-transitory storage device, such as a solid state drive, hard disk drive, a magnetic disk drive, an optical disk drive, USB drive, or any computer program product configured to store data and machine executable program code. According to certain embodiments, the memory 1020 or mass storage 1030 may have recorded thereon statements and instructions executable by the processor 1010 for performing any of the aforementioned method operations described above.

Embodiments of the present invention can be implemented using electronics hardware, software, or a combination thereof. In some embodiments, the invention is implemented by one or multiple computer processors executing program instructions stored in memory. In some embodiments, the invention is implemented partially or fully in hardware, for example using one or more field programmable gate arrays (FPGAs) or application specific integrated circuits (ASICs) to rapidly perform processing operations.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Further, each operation of the method may be executed on any computing device, such as a personal computer, server, PDA, or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method comprising:
   sending, from a first station to a second station, through an access point (AP) connected with each of the first station and the second station, a discovery request to obtain identifying information from the second station, only one of the first station and the second station having an affiliation with a non-access point multi-link device (non-AP MLD); and
   receiving, at the first station from the second station, through the AP, a discovery response providing the identifying information,
      the identifying information including a link identifier indicating the affiliation with the non-AP MLD,
      the AP MLD being affiliated with one or more affiliate APs, the one or more affiliate APs including the AP; and
      at least one of the discovery request and the discovery response includes a multi-link element (MLE) indicating at least one of a respective MAC address of each of the AP MLD and the one or more affiliate APs.

2. The method of claim 1, further comprising:
   receiving, at the first station from the AP, a message indicating a MAC address of the second station.

3. The method of claim 1,
   the method further comprising:
      sending, from the first station to the second station through the AP, a setup request; and
      receiving, at the first station from the second station through the AP, a setup response.

4. The method of claim 1, wherein:
   the only one of the first station and the second station having the affiliation with the non-AP MLD is an affiliated station;
   the one of the first station and the second station lacking the affiliation with the non-AP MLD is an unaffiliated station; and
   the setup request indicates an authentication and key management (AKM) suite for establishing a link between the unaffiliated station and the non-AP MLD through the affiliated station.

5. The method of claim 4, further comprising:
   deriving, by the first station, a key based on the AKM suite; and
   sending, from the first station to the second station through the AP, a setup confirmation message.

6. The method of claim 5, wherein the key is derived in accordance with each of a respective MAC address of each of the AP MLD and the non-AP MLD.

7. The method of claim 5, wherein:
the unaffiliated station has a security association with the AP through a first authenticator associated with the AP;
the non-AP MLD has a security association with the AP MLD through a second authenticator associated with the AP MLD; and
the key is bound to each of the first authenticator and the second authenticator.

8. A method comprising:
receiving, at a first station from a second station, a discovery request for identifying information from the first station, only one of the first station and the second station having an affiliation with a non-access point multi-link device (non-AP MLD), the discovery request being received through an access point (AP) connected with each of the first station and the second station, the AP being affiliated with the AP MLD, the AP MLD providing the AP with a connection to a network; and
sending, from the first station to the second station, through the AP, a discovery response providing the identifying information, the identifying information including a link identifier indicating the affiliation with the non-AP MLD;
the AP MLD being affiliated with one or more affiliate APs, the one or more affiliate APs including the AP; and
at least one of the discovery request and the discovery response including a multi-link element (MLE) indicating at least one of a respective MAC address of the AP MLD and the one or more affiliate APs.

9. The method of claim 8, further comprising:
receiving, at the first station from an access point (AP) connected to each of the first station and the second station, a message indicating a MAC address of the second station.

10. The method of claim 8, wherein:
the only one of the first station and the second station having the affiliation with the non-AP MLD is an affiliated station;
the one of the first station and the second station lacking the affiliation with the non-AP MLD is an unaffiliated station;
and
the method further comprises:
receiving, at the first station from the second station through the AP, a setup request indicating an authentication and key management (AKM) suite for establishing a
link between the unaffiliated station and the non-AP MLD through the affiliated station;
deriving, by the first station, a key based on the AKM suite; and
sending, from the first station to the second station through the AP, a setup response indicating the AKM suite.

11. The method of claim 10, further comprising:
receiving, at the first station from the second station through the AP, a setup confirmation message indicating the establishment of the link between the unaffiliated station and the non-AP MLD through the affiliated station.

12. A system comprising a first station and a second station,
only one of the first station and the second station having an affiliation with a non-access point multi-link device (non-AP MLD),
the first station being configured to send, to the second station, a discovery request to obtain identifying information from the second station,
the second station being configured to send, to the first station, a discovery response providing the identifying information,
the identifying information including a link identifier indicating the affiliation with the non-AP MLD
the first station being further configured to send, to the second station through an access point (AP) connected to each of the first station and the second station, a setup request indicating an authentication and key management (AKM) suite, and
the second station being further configured to, when the setup request is received, derive, a first key based on the AKM suite, and send, to the first station through the AP, a setup response.

13. The system of claim 12, wherein:
the first station is further configured to receive, from the AP, a message indicating a MAC address of the second station; and
the second station is further configured to receive, from the AP, a message indicating a MAC address of the first station.

14. The system of claim 12, wherein:
the only one of the first station and the second station having the affiliation with the non-AP MLD is an affiliated station;
the one of the first station and the second station lacking the affiliation with the non-AP MLD is an unaffiliated station;
the first station is further configured to:
derive, a second key based on the AKM suite and the setup response; and
send, to the second station through the AP, a setup confirmation message indicating the establishment of a link between the unaffiliated station and the non-AP MLD through the affiliated station; and
the second station is further configured to:
receive, from the first station through the AP, the setup confirmation message.

15. The system of claim 14, wherein:
the unaffiliated station has a security association with the AP through a first authenticator associated with the AP;
the non-AP MLD has a security association with the AP MLD through a second authenticator associated with the AP MLD; and
the first key and the second key are each bound to each of the first authenticator and the second authenticator.

* * * * *